US012619338B2

(12) United States Patent
Lopez et al.

(10) Patent No.: US 12,619,338 B2
(45) Date of Patent: *May 5, 2026

(54) PROCESSING SYSTEM HAVING A MACHINE LEARNING ENGINE FOR PROVIDING A SELECTABLE ITEM AVAILABILITY OUTPUT

(71) Applicant: Allstate Insurance Company, Northbrook, IL (US)

(72) Inventors: Salvador Lopez, Round Lake, IL (US); Dean Krieter, Rolling Meadows, IL (US); Pavan Neelakanthana Gouda, Bangalore (IN); Vikram Narra, Prospect Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,250

(22) Filed: Apr. 13, 2023

(65) Prior Publication Data

US 2023/0325058 A1 Oct. 12, 2023

Related U.S. Application Data

(63) Continuation of application No. 16/118,569, filed on Aug. 31, 2018, now Pat. No. 11,635,877, which is a
(Continued)

(51) Int. Cl.
*G06F 3/00* (2006.01)
*G06F 3/0482* (2013.01)
(Continued)

(52) U.S. Cl.
CPC .......... *G06F 3/0484* (2013.01); *G06F 3/0482* (2013.01); *G06F 40/174* (2020.01);
(Continued)

(58) Field of Classification Search
CPC .... G06F 3/0484; G06F 40/174; G06F 3/0482; G06N 20/00; G06Q 30/0635; G06Q 30/0641
See application file for complete search history.

(56) References Cited

U.S. PATENT DOCUMENTS

| | | | |
|---|---|---|---|
| 5,905,973 A | 5/1999 | Yonezawa et al. | |
| 6,266,649 B1 | 7/2001 | Linden et al. | |

(Continued)

FOREIGN PATENT DOCUMENTS

| | | |
|---|---|---|
| CN | 103473354 A | 12/2013 |
| CN | 104463630 A | 3/2015 |
| EP | 1658743 A1 | 5/2006 |

OTHER PUBLICATIONS

Jun. 5, 2023—(US) Final Office Action—U.S. Appl. No. 17/549,167, 20 Pages.

(Continued)

*Primary Examiner* — Jessica S Manno
*Assistant Examiner* — Andrew Chung

(57) ABSTRACT

Aspects of the disclosure relate to enhanced selectable item availability processing systems with improved content and configuration update capability and enhanced selectable item availability output determinations. A computing platform may receive a selectable item availability configuration output comprising a configuration update to the selectable item availability output and a selectable item availability content output comprising a content update to the selectable item availability output. Based on the selectable item availability configuration output and the selectable item availability content output, the computing platform may generate an updated selectable item availability output. The computing platform may receive a request to access the selectable item availability output. The computing platform may generate one or more commands to cause display of the updated
(Continued)

305

Warm Up Questions Configuration

Group

2 – Drop Down

| Question/Component | Content Key | Group ID | Order | State | Action |
|---|---|---|---|---|---|
| 4 | Welcome_DateOfBirth | 2 | 1 | N/A | Edit |
| 5 | Welcome_WhatGenderText | 2 | 2 | Select | Edit | selectable item availability output and may send, to a user device, the updated selectable item availability output along with the one or more commands.

17 Claims, 25 Drawing Sheets

Related U.S. Application Data continuation-in-part of application No. 15/947,102, filed on Apr. 6, 2018, now Pat. No. 11,199,943.

(51) Int. Cl.
| | |
|---|---|
| *G06F 3/0484* | (2022.01) |
| *G06F 40/174* | (2020.01) |
| *G06N 20/00* | (2019.01) |
| *G06Q 30/0601* | (2023.01) |

(52) U.S. Cl.
CPC ......... *G06N 20/00* (2019.01); *G06Q 30/0635* (2013.01); *G06Q 30/0641* (2013.01)

(56) References Cited

U.S. PATENT DOCUMENTS

| | | | |
|---|---|---|---|
| 6,317,722 | B1 | 11/2001 | Jacobi et al. |
| 7,019,759 | B1 | 3/2006 | Moore et al. |
| 7,114,131 | B1 | 9/2006 | Ballantine |
| D531,186 | S | 10/2006 | Sauter |
| D605,199 | S | 12/2009 | Nagata et al. |
| 7,734,508 | B2 | 6/2010 | Hayes et al. |
| D637,605 | S | 5/2011 | Brinda |
| 8,024,234 | B1 | 9/2011 | Thomas et al. |
| D650,800 | S | 12/2011 | Impas et al. |
| D661,701 | S | 6/2012 | Brown et al. |
| 8,244,564 | B2 | 8/2012 | Selinger et al. |
| 8,352,914 | B2 | 1/2013 | Sarkar et al. |
| 8,370,203 | B2 | 2/2013 | Dicker et al. |
| 8,543,463 | B2 | 9/2013 | Zakas et al. |
| D691,171 | S | 10/2013 | Brinda et al. |
| D692,905 | S | 11/2013 | Marshall et al. |
| 8,577,749 | B2 | 11/2013 | Aliabadi et al. |
| 8,606,770 | B2 | 12/2013 | Gregov et al. |
| D697,936 | S | 1/2014 | Lee et al. |
| D697,937 | S | 1/2014 | Lee et al. |
| D701,879 | S | 4/2014 | Foit et al. |
| 8,799,000 | B2 * | 8/2014 | Guzzoni ............. G06F 16/3329 |
| | | | 709/224 |
| D716,316 | S | 10/2014 | Behzadi et al. |
| D717,822 | S | 11/2014 | Brotman et al. |
| D720,361 | S | 12/2014 | Mitchell et al. |
| D726,216 | S | 4/2015 | Tabata et al. |
| D726,218 | S | 4/2015 | Marianek et al. |
| D730,935 | S | 6/2015 | Franganillo et al. |
| D732,062 | S | 6/2015 | Kwon |
| D732,566 | S | 6/2015 | Mitchell et al. |
| D736,810 | S | 8/2015 | Hisada et al. |
| D738,895 | S | 9/2015 | Myoung et al. |
| D738,907 | S | 9/2015 | Cabrera-Cordon et al. |
| D738,913 | S | 9/2015 | Cabrera-Cordon et al. |
| D740,846 | S | 10/2015 | Mitchell et al. |
| D741,356 | S | 10/2015 | Park et al. |
| D741,896 | S | 10/2015 | Park et al. |
| 9,189,131 | B2 | 11/2015 | Thiruvidam et al. |
| D744,509 | S | 12/2015 | Moriya |
| D748,101 | S | 1/2016 | Bang et al. |
| D753,131 | S | 4/2016 | Cuthbert et al. |
| D753,132 | S | 4/2016 | Cuthbert et al. |
| D753,685 | S | 4/2016 | Zimmerman et al. |
| D754,689 | S | 4/2016 | Lee |
| D755,819 | S | 5/2016 | Gao et al. |
| D757,026 | S | 5/2016 | Lim et al. |
| D759,069 | S | 6/2016 | Sakalowsky et al. |
| D759,079 | S | 6/2016 | Carlton et al. |
| D759,678 | S | 6/2016 | Jung et al. |
| 9,360,997 | B2 | 6/2016 | Missig et al. |
| D765,115 | S | 8/2016 | Pierson et al. |
| D768,144 | S | 10/2016 | Kim et al. |
| D771,075 | S | 11/2016 | Moriya |
| D775,142 | S | 12/2016 | Leise |
| D782,497 | S | 3/2017 | Barry et al. |
| D782,504 | S | 3/2017 | Lee et al. |
| D783,029 | S | 4/2017 | Lee et al. |
| D783,648 | S | 4/2017 | Vazquez et al. |
| D783,675 | S | 4/2017 | Yagisawa et al. |
| D785,640 | S | 5/2017 | Cruttenden et al. |
| D786,273 | S | 5/2017 | Herman et al. |
| D786,274 | S | 5/2017 | Lee et al. |
| D786,897 | S | 5/2017 | Nageli et al. |
| D790,562 | S | 6/2017 | Nageli et al. |
| D803,232 | S | 11/2017 | Leigh et al. |
| D803,854 | S | 11/2017 | Suzuki |
| D805,541 | S | 12/2017 | Juliano |
| D812,073 | S | 3/2018 | Lehmann |
| D815,645 | S | 4/2018 | Felt |
| D816,678 | S | 5/2018 | Felt |
| D819,065 | S | 5/2018 | Xie et al. |
| D819,662 | S | 6/2018 | Leise |
| D828,364 | S | 9/2018 | Felt |
| D830,385 | S | 10/2018 | Lepine et al. |
| D830,389 | S | 10/2018 | Witt et al. |
| D835,151 | S | 12/2018 | Martin et al. |
| D835,155 | S | 12/2018 | Bickerstaff et al. |
| D835,648 | S | 12/2018 | Begin et al. |
| D835,666 | S | 12/2018 | Saleh et al. |
| D836,123 | S | 12/2018 | Pillalamarri et al. |
| D836,658 | S | 12/2018 | Andrew |
| D836,659 | S | 12/2018 | Andrew |
| D837,816 | S | 1/2019 | Sanchez |
| D838,281 | S | 1/2019 | Buchter et al. |
| D838,290 | S | 1/2019 | Clymer et al. |
| D838,737 | S | 1/2019 | Martin et al. |
| D839,294 | S | 1/2019 | Mazlish et al. |
| D839,299 | S | 1/2019 | Lee et al. |
| D839,884 | S | 2/2019 | Mussinov et al. |
| D839,895 | S | 2/2019 | Dell |
| D839,900 | S | 2/2019 | Gan |
| D839,914 | S | 2/2019 | Lee et al. |
| D840,412 | S | 2/2019 | Donini et al. |
| D841,045 | S | 2/2019 | Clymer et al. |
| 10,521,865 | B1 | 12/2019 | Spader et al. |
| 10,861,115 | B1 | 12/2020 | Stricker et al. |
| 2001/0037265 | A1 | 11/2001 | Kleinberg |
| 2001/0054017 | A1 | 12/2001 | Wakabayashi et al. |
| 2002/0040372 | A1 | 4/2002 | Ide |
| 2003/0004836 | A1 | 1/2003 | Otter et al. |
| 2003/0149600 | A1 | 8/2003 | Williams |
| 2005/0283371 | A1 | 12/2005 | Tiramani |
| 2007/0143347 | A1 | 6/2007 | McGee |
| 2007/0250783 | A1 | 10/2007 | Wu et al. |
| 2008/0091461 | A1 | 4/2008 | Evans et al. |
| 2009/0204577 | A1 | 8/2009 | Mayer-Ullmann et al. |
| 2009/0276368 | A1 | 11/2009 | Martin et al. |
| 2010/0251304 | A1 | 9/2010 | Donoghue et al. |
| 2010/0259375 | A1 | 10/2010 | Ferren et al. |
| 2010/0262710 | A1 | 10/2010 | Khatib et al. |
| 2010/0269054 | A1 | 10/2010 | Goldberg et al. |
| 2011/0035238 | A1 * | 2/2011 | Salvagio ............... G06Q 40/08 |
| | | | 707/E17.107 |
| 2011/0105226 | A1 | 5/2011 | Perlman |
| 2011/0213629 | A1 | 9/2011 | Clark et al. |
| 2012/0246024 | A1 | 9/2012 | Thomas et al. |
| 2013/0054595 | A1 | 2/2013 | Isaev et al. |
| 2013/0204645 | A1 | 8/2013 | Lehman et al. |
| 2014/0056540 | A1 | 2/2014 | Hamburg et al. |
| 2014/0129951 | A1 | 5/2014 | Amin et al. |
| 2014/0298200 | A1 | 10/2014 | Cierniak |
| 2014/0302470 | A1 * | 10/2014 | Zapantis ............... G16H 20/30 |
| | | | 434/236 |
| 2015/0007055 | A1 | 1/2015 | Lemus et al. |
| 2015/0134547 | A1 | 5/2015 | Oikonomidis |
| 2015/0187015 | A1 | 7/2015 | Adams et al. |
| 2015/0188720 | A1 | 7/2015 | Winter |

(56) References Cited

U.S. PATENT DOCUMENTS

| | | |
|---|---|---|
| 2015/0324940 A1 | 11/2015 | Samson et al. |
| 2015/0332088 A1 | 11/2015 | Chembula |
| 2015/0363862 A1 | 12/2015 | Ranft et al. |
| 2016/0092959 A1 | 3/2016 | Gross |
| 2016/0162992 A1 | 6/2016 | England |
| 2016/0239867 A1 | 8/2016 | Sinha et al. |
| 2016/0292769 A1 | 10/2016 | Colson et al. |
| 2017/0021764 A1 | 1/2017 | Adams et al. |
| 2017/0032466 A1 | 2/2017 | Feldman et al. |
| 2017/0236182 A1 | 8/2017 | Ignatyev |
| 2018/0032505 A1 | 2/2018 | Hoetzer et al. |
| 2018/0052981 A1 | 2/2018 | Nygate et al. |
| 2019/0130244 A1 | 5/2019 | Mars et al. |
| 2019/0238944 A1 | 8/2019 | Balasubramanian et al. |
| 2019/0251150 A1 | 8/2019 | Vinay et al. |
| 2019/0310742 A1 | 10/2019 | Lopez et al. |
| 2019/0310748 A1 | 10/2019 | Lopez et al. |
| 2019/0347758 A1 | 11/2019 | Keramidas et al. |
| 2020/0026778 A1 | 1/2020 | Miller et al. |
| 2020/0097970 A1 | 3/2020 | Gupta et al. |
| 2020/0349258 A1 | 11/2020 | Frost et al. |

OTHER PUBLICATIONS

Jun. 6, 2023—(CA) Office Action—App 3,039,365, 8 Pages.

Dec. 12, 2019—(US) Non-Final Office Action—U.S. Appl. No. 15/947,102, 28 Pages.

Dec. 12, 2019—(US) Non-Final Office Action—U.S. Appl. No. 16/118,569, 31 Pages.

Mar. 6, 2019—(US) Notice of Allowance—U.S. Appl. No. 29/644,248 (006591.01734), 19 Pages.

Mar. 6, 2019—(US) Notice of Allowance—U.S. Appl. No. 29/644,246 (006591.01733), 20 Pages.

Mar. 12, 2019—(US) Notice of Allowance—U.S. Appl. No. 29/644,236 (006591.01731), 17 Pages.

Mar. 6, 2019—(US) Notice of Allowance—U.S. Appl. No. 29/644,243 (006591.01732), 17 Pages.

May 4, 2020—(CA) Office Action—Application No. 3,039,365, 4 Pages.

Sep. 18, 2020—(US) Final Office Action—U.S. Appl. No. 16/118,569 (006591.01819), 35 Pages.

Sep. 21, 2020—(US) Final Office Action—U.S. Appl. No. 15/947,102 (006591.01730), 38 Pages.

Dec. 30, 2021—(CA) Office Action—Application No. 3,039,365, 7 Pages.

Feb. 23, 2021—(CA) Office Action—Application No. 3,039,365 (006591.02128), 7 Pages.

Mar. 24, 2021—(US) Non-Final Office Action—U.S. Appl. No. 15/947,102 (006591.01730), 28 Pages.

Mar. 24, 2021—(US) Non-Final Office Action—U.S. Appl. No. 16/118,569 (006591.01819), 35 Pages.

Cortizo J.S., "Shopping Cart Page Recommendation Strategy" BrainSINS, Retrieved from the Internet URL: https://www.brainsins.com/en/blog/hopping-cart-page-recommendation-strategy/2496 on Mar. 28, 2018, 1-9 pages.

Hilson J., "Insurance in Your Shopping Cart: How e-Commerce Will Affect the PH Insurance Industry," Linkedin, Feb. 28, 2017, Retrieved from the Internet URL: https://www.linkedin.com/pulse/insurance-your-shopping-cart-how-e-commerce-affect-ph-john-hilson on Feb. 13, 2017, pp. 1-3.

Kraweic T., "The Amazon Recommendations Secret to Selling More Online," Retrieved from the Internet URL: http://rejoiner.com/resources/imazon-recommendations-secret-selling-online/ on Mar. 28, 2018, pp. 1-18.

Jan. 5, 2024—(US) Non-Final Office Action—U.S. Appl. No. 17/549,167, 31 Pages.

Sep. 12, 2024—(CA) Office Action—App 3,039,365, 7 Pages.

Dec. 3, 2024—(US) Non-Final Office Action—U.S. Appl. No. 17/549,167, 28 Pages.

* cited by examiner

102

111

112

Switchboard Output Control Computing Platform

Processor(s)

Memory(s)

Switchboard Output Control Module
112a

Switchboard Output Control Database
112b

Machine Learning Engine
112c

113

Communication Interface(s)

104

117

118

119

PROCESSING SYSTEM HAVING A MACHINE LEARNING ENGINE FOR PROVIDING A SELECTABLE ITEM AVAILABILITY OUTPUT

CROSS-REFERENCE TO RELATED CASES

This application is a continuation of and claims priority to application Ser. No. 16/118,569, entitled PROCESSING SYSTEM HAVING A MACHINE LEARNING ENGINE FOR PROVIDING A SELECTABLE ITEM AVAILABILITY OUTPUT, filed Aug. 31, 2018, which is a continuation-in-part of application Ser. No. 15/947,102, entitled PROCESSING SYSTEM HAVING A MACHINE LEARNING ENGINE FOR PROVIDING A SELECTABLE ITEM AVAILABILITY OUTPUT, filed Apr. 6, 2018. Each of these applications is incorporated by reference in its entirety herein.

BACKGROUND

Aspects of the disclosure relate to enhanced processing systems, for providing a selectable item availability output, with improved content and configuration modification capabilities and selectable item availability output determination capabilities. In particular, one or more aspects of the disclosure relate to selectable item availability generation platforms that utilize selectable item availability configuration and content outputs to improve efficiency of selectable item availability content and configuration updates and to facilitate selectable item availability transactions.

Because many organizations and individuals rely on portals as a method for purchasing products, maintaining purchasing efficiency for users and maintaining content and configuration update efficiency for organizations is important. In many instances, however, it may be difficult to quickly update and revise content and configurations of these portals without recoding the portal. In addition, in many instances, it may it may be difficult for users to purchase multiple products without entering the same personal information multiple times.

SUMMARY

Aspects of the disclosure provide effective, efficient, scalable, and convenient technical solutions that address and overcome the technical problems associated with optimizing the performance of switchboard output control computing platforms, content output control computing platforms, and selectable item availability generation computing platforms, along with the information that such systems may maintain, using switchboard output control, content output control, and selectable item availability generation techniques.

In accordance with one or more arrangements discussed herein, a computing platform having at least one processor, a communication interface, and memory may establish, with a user device, a first wireless data connection. The computing platform may receive, from the user device and via the first wireless data connection, a request to access a selectable item availability output. The computing platform may generate one or more commands to cause display of the selectable item availability output. The computing platform may send, to the user device and along with the one or more commands to cause display of the selectable item availability output, selectable item availability output information. The computing platform may receive, from a switchboard output control computing platform, a selectable item availability configuration output comprising a configuration update to the selectable item availability output. The computing platform may receive, from a content output control computing platform, a selectable item availability content output comprising a content update to the selectable item availability output. The computing platform may generate, via machine learning algorithms and datasets, based on the selectable item availability configuration output, and based on the selectable item availability content output, an updated selectable item availability output. The computing platform may receive, from the user device and via the first wireless data connection, a second request to access the selectable item availability output. The computing platform may generate one or more commands to cause display of the updated selectable item availability output. The computing platform may send, to the user device and along with the one or more commands to cause display of the selectable item availability output, the updated selectable item availability outputs.

In some arrangements, the computing platform may establish, with the switchboard output control computing platform, a second wireless data connection. The computing platform may establish, with the content output control computing platform, a third wireless data connection.

In some examples, the selectable item availability configuration output may be received via the second wireless data connection and the selectable item availability content output may be received via the third wireless data connection.

In some arrangements, the selectable item availability configuration output may comprise an update to at least one of an order of a question on one or more user interfaces comprising the selectable item availability output and a group identifier comprising an indication of a selection tool used to provide user input in response to the question.

In some examples, the selectable item availability content output may comprise an update to at least one of: a video displayed by one or more user interfaces comprising the selectable item availability output, text displayed on the one or more user interfaces comprising the selectable item availability output, a language in which the text is displayed, and a product with which the text or the video is associated.

In some arrangements, the selectable item availability configuration output and the selectable item availability content output may be generated in response to user input received via a user interface displayed on a selectable item availability management computing platform.

In some examples, the computing platform may establish, with a third party source computing platform, a second wireless data connection. The computing platform may generate one or more commands directing the third party source computing platform to provide source data associated with received data. The computing platform may send, to the third party source computing platform, via the second wireless data connection, and along with an indication of the received data, the one or more commands directing the third party source computing platform to provide source data. The computing platform may receive, from the third party source computing platform and via the second wireless data connection, third party source data.

In some arrangements, the computing platform may generate the updated selectable item availability output by generating, based at least in part on the third party source data, the updated selectable item availability output.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

It may be difficult for organizations to determine how best to determine selectable item availability outputs that prompt customers for personal information that may be used to identify multiple product options simultaneously once the personal information has been entered. A processing system capable of determining multiple products simultaneously may reduce an amount of time a customer may spend trying to purchase products, as it may eliminate instances of data reentry. It may take organizations significant amounts of time to make edits to such a processing system. Organizations may send requested user interface modifications to developers, who may then recode the interfaces based on the requests. A system that allows an organization to modify the configuration and content of the user interfaces on the spot may be advantageous, as it may reduce the amount of time for organizations to go live with user interface modifications.

Figure 1A:
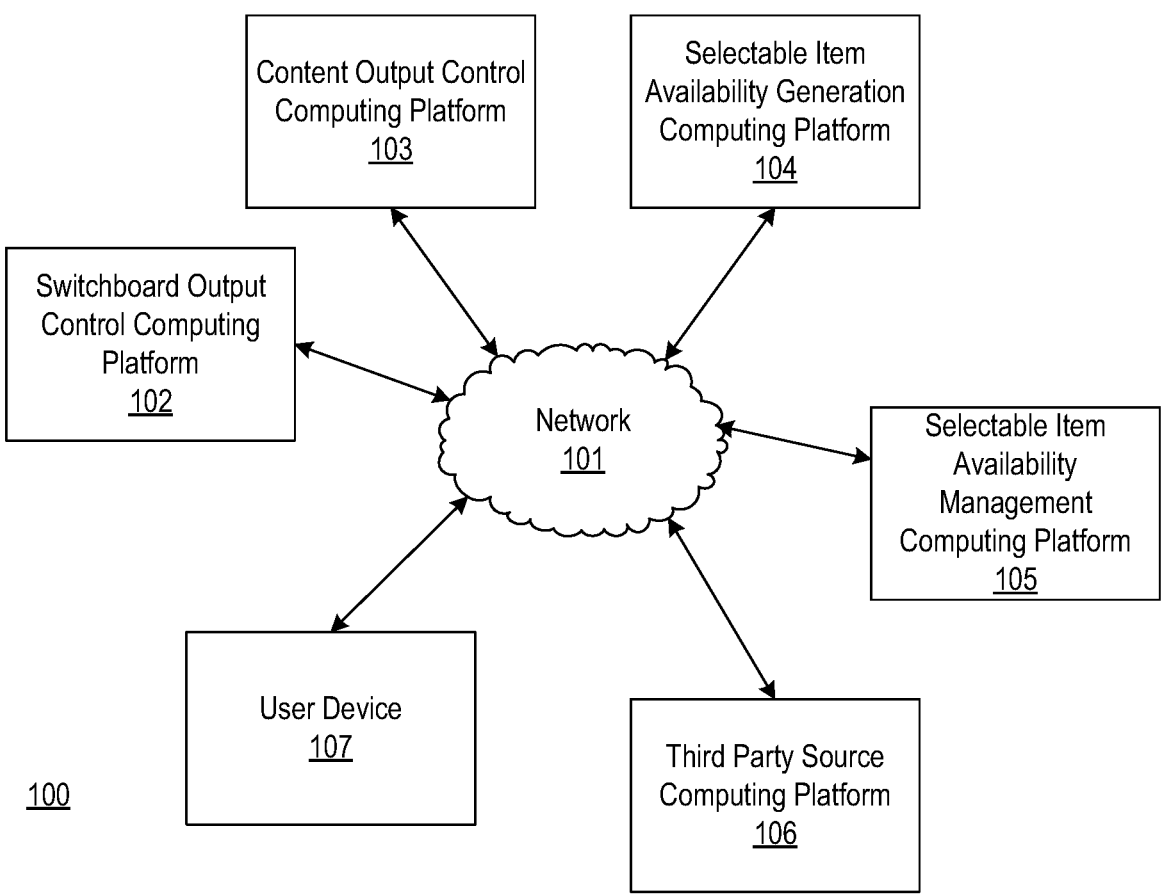
FIGS. 1A-1D depict an illustrative computing environment for deploying a switchboard output control computing platform, a content output control computing platform, and a selectable item availability generation computing platform that utilize improved selectable item availability output generation techniques in accordance with one or more example arrangements discussed herein.

FIGS. 1A-1D depict an illustrative computing environment for deploying a selectable item availability generation computing platform that utilizes improved selectable item availability generation techniques in accordance with one or more example embodiments. Referring to FIG. 1A, computing environment 100 may include one or more computer systems. For example, computing environment 100 may include a switchboard output control computing platform 102, a content output control computing platform 103, a selectable item availability generation computing platform 104, one or more selectable item availability management computing platforms 105, one or more third party source computing platforms 106, and one or more user devices 107.

As illustrated in greater detail below, switchboard output control computing platform 102 may include one or more computing devices configured to perform one or more of the functions described herein. For example, switchboard output control computing platform 102 may include one or more computers (e.g., laptop computers, desktop computers, servers, server blades, or the like) configured to receive selectable item availability configuration requests, to ingest selectable item availability configuration requests, and to generate selectable item availability configuration outputs. In some instances, the switchboard output control computing platform 102 may be integrated into the content output control computing platform 103.

In addition, and as illustrated in greater detail below, the switchboard output control computing platform 102 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by switchboard output control computing platform 102 may be associated with an internal portal provided by an organization, such as a selectable item availability configuration portal provided by an insurance institution.

As illustrated in greater detail below, content output control computing platform 103 may include one or more computing devices configured to perform one or more of the functions described herein. For example, content output control computing platform 103 may include one or more computers (e.g., laptop computers, desktop computers, servers, server blades, or the like) configured to receive selectable item availability content requests, to ingest selectable item availability content requests, and to generate selectable item availability content outputs. In some instances, the content output control computing platform 103 may be integrated into the switchboard output control computing platform 102.

In addition, and as illustrated in greater detail below, the content output control computing platform 103 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by content output control computing platform 103 may be associated with an internal portal provided by an organization, such as a selectable item availability content portal provided by an insurance institution.

As illustrated in greater detail below, selectable item availability generation computing platform 104 may include one or more computing devices configured to perform one or more of the functions described herein. For example, selectable item availability generation computing platform 104 may include one or more computers (e.g., laptop computers, desktop computers, servers, server blades, or the like) configured to receive requests to access selectable item availability outputs, ingest selectable item availability configuration outputs, ingest selectable item availability content outputs, and to generate, based on the selectable item availability configuration outputs and selectable item availability content outputs, selectable item availability outputs.

Selectable item availability generation computing platform 104 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by selectable item availability generation computing platform 104 may be associated with an internal portal provided by an organization, such as an insurance purchasing portal provided by an insurance institution. In addition, selectable item availability generation computing platform 104 may be configured to receive requests (e.g., requests to generate a selectable item availability output from a user device 107 and/or to cause output of the selectable item availability output) from one or more remote computing devices and/or perform various functions with respect to such requests, as discussed in greater detail below.

Selectable item availability management computing platform 105 may be a computing platform associated with an organization that controls the selectable item availability outputs. For example, the selectable item availability management computing platform 105 may be accessed by an employee of the organization, and may be used to collect user input associated with modifications to the selectable item availability configuration or content. The selectable item availability management computing platform 105 may comprise, for example, a desktop or laptop computer, a smartphone, personal digital assistant, tablet computer, or the like.

Third party source computing platform 106 may comprise one or more computing devices and/or other computer components (e.g., processors, memories, communication interfaces). The third party source computing platform 106 may comprise a database of third party source data, such as housing records, vehicle records, manufacturer records, historical source data, and the like. The third party source computing platform 106 may receive requests, from the selectable item availability generation computing platform 104, for third party source data related to input provided via selectable item availability interfaces on the user device 107.

User device 107 may be a mobile device such as a smartphone, personal digital assistant, or tablet computer, or the like.

In addition, and as illustrated in greater detail below, user device 107 may be configured to generate, host, transmit, and/or otherwise provide one or more web pages and/or other graphical user interfaces (which may, e.g., cause one or more other computer systems to display and/or otherwise present the one or more web pages and/or other graphical user interfaces). In some instances, the web pages and/or other graphical user interfaces generated by user device 107 may be associated with an internal portal provided by an organization.

Computing environment 100 also may include one or more networks, which may interconnect one or more of switchboard output control computing platform 102, content output control computing platform 103, selectable item availability generation computing platform 104, selectable item availability management computing platform 105, third party source computing platform 106, and user device 107. For example, computing environment 100 may include a network 101 (which may, e.g., interconnect switchboard output control computing platform 102, content output control computing platform 103, selectable item availability generation computing platform 104, selectable item availability management computing platform 105, third party source computing platform 106, and user device 107).

In one or more arrangements, switchboard output control computing platform 102, content output control computing platform 103, selectable item availability generation computing platform 104, selectable item availability management computing platform 105, third party source computing platform 106, and user device 107, and/or the other systems included in computing environment 100 may be any type of computing device capable of receiving a user interface, receiving input via the user interface, and communicating the received input to one or more other computing devices. For example, switchboard output control computing platform 102, content output control computing platform 103, selectable item availability generation computing platform 104, selectable item availability management computing platform 105, third party source computing platform 106, and user device 107, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of switchboard output control computing platform 102, content output control computing platform 103, selectable item availability generation computing platform 104, selectable item availability management computing platform 105, third party source computing platform 106, and user device 107 may, in some instances, be special-purpose computing devices configured to perform specific functions.

Figure 1B:
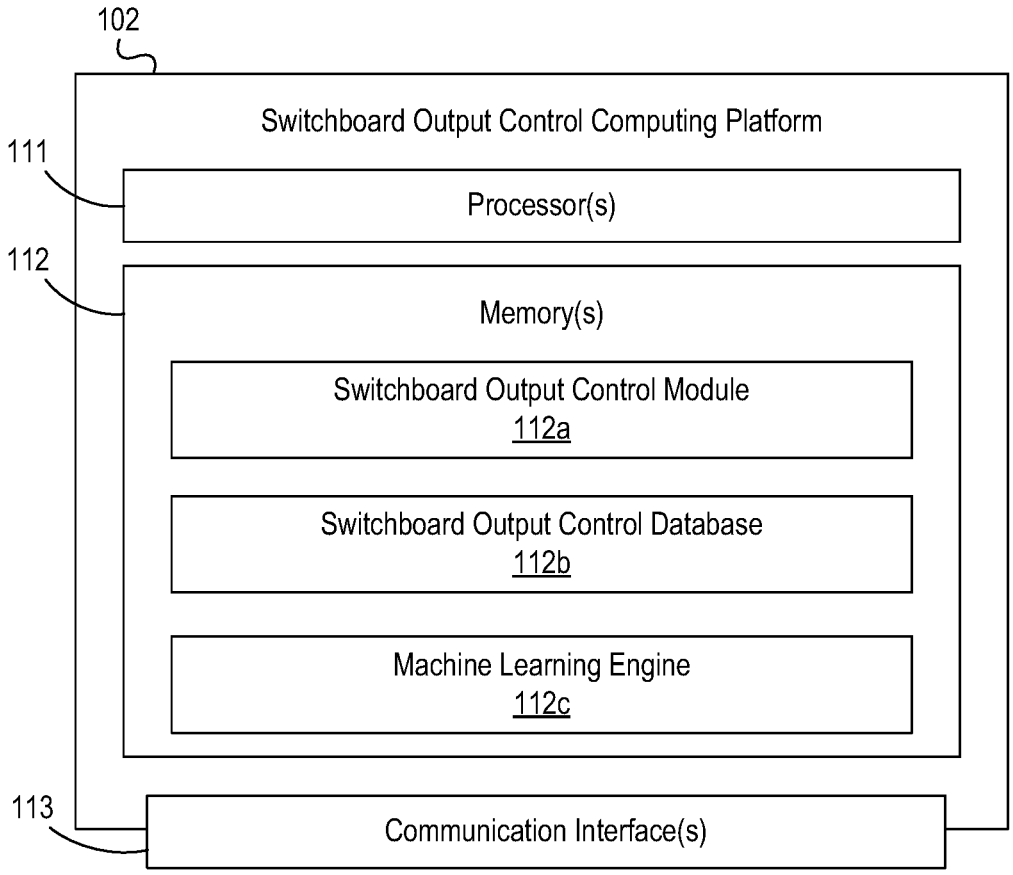

Referring to FIG. 1B, switchboard output control computing platform 102 may include one or more processors 111, memory 112, and communication interface 113. A data bus may interconnect processor 111, memory 112, and communication interface 113. Communication interface 113 may be a network interface configured to support communication between switchboard output control computing platform 102 and one or more networks (e.g., network 101, or the like). Memory 112 may include one or more program modules having instructions that when executed by processor 111 cause switchboard output control computing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of switchboard output control computing platform 102 and/or by different computing devices that may form and/or otherwise make up switchboard output control computing platform 102. For example, memory 112 may have, store, and/or include a switchboard output control module 112a, a switchboard output control database 112b, and a machine learning engine 112c. Switchboard output control module 112a may have instructions that direct and/or cause switchboard output control computing platform 102 to execute advanced selectable item availability generation techniques, as discussed in greater detail below. Switchboard output control database 112b may store information used by switchboard output control module 112a and/or switchboard output control computing platform 102 in switchboard output control and/or in performing other functions. Machine learning engine 112c may have instructions that direct and/or cause the switchboard output control computing platform 102 to perform switchboard output control and to set, define, and/or iteratively refine optimization rules and/or other parameters used by the switchboard output control computing platform 102 and/or other systems in computing environment 100.

Figure 1C:
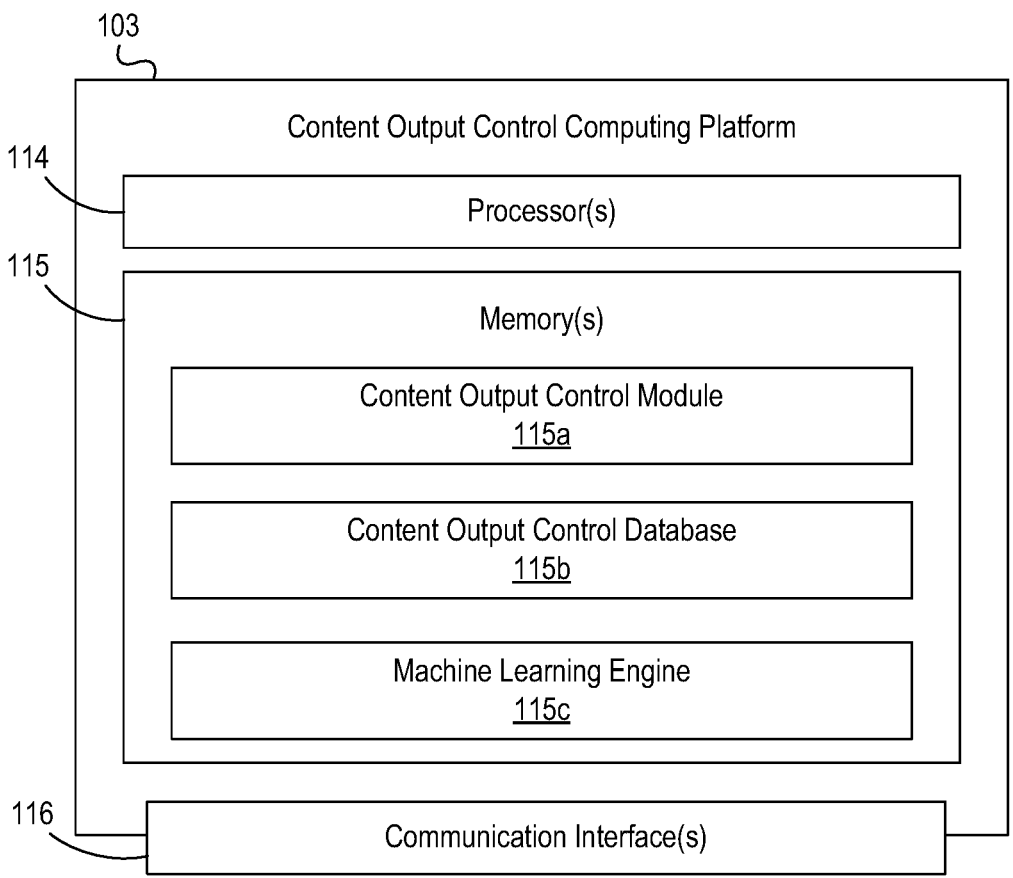

Referring to FIG. 1C, content output control computing platform 103 may include one or more processors 114, memory 115, and communication interface 116. A data bus may interconnect processor 114, memory 115, and communication interface 116. Communication interface 116 may be a network interface configured to support communication between content output control computing platform 103 and one or more networks (e.g., network 101, or the like). Memory 115 may include one or more program modules having instructions that when executed by processor 114 cause content output control computing platform 103 to perform one or more functions described herein and/or one or more databases that may store and/or otherwise maintain information which may be used by such program modules and/or processor 114. In some instances, the one or more program modules and/or databases may be stored by and/or maintained in different memory units of content output control computing platform 103 and/or by different computing devices that may form and/or otherwise make up content output control computing platform 103. For example, memory 115 may have, store, and/or include a content output control module 115a, a content output control database 115b, and a machine learning engine 115c. Content output control module 115a may have instructions that direct and/or cause content output control computing platform 103 to execute advanced content output control techniques, as discussed in greater detail below. Content output control database 115b may store information used by content output control module 115a and/or content output control computing platform 103 in content output control and/or in performing other functions. Machine learning engine 115c may have instructions that direct and/or cause the content output control computing platform 103 to perform content output control and to set, define, and/or iteratively refine optimization rules and/or other parameters used by the content output control computing platform 103 and/or other systems in computing environment 100.

Figure 1D:
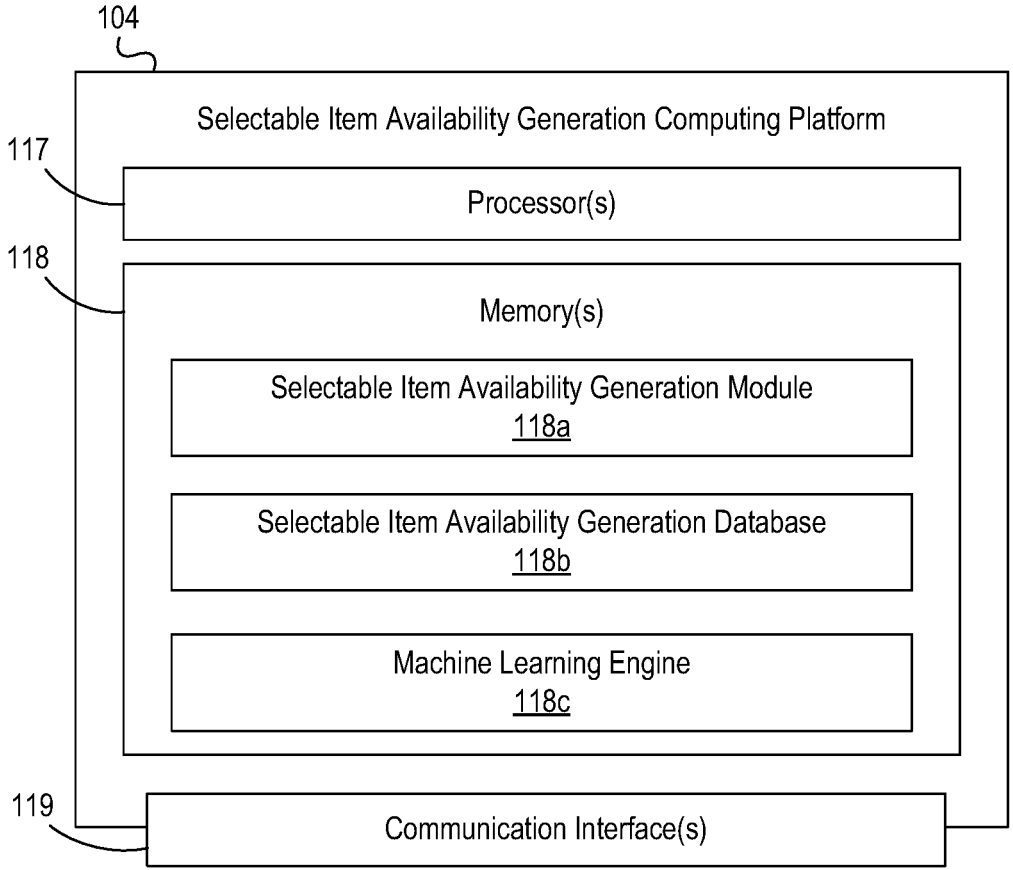

Referring to FIG. 1D, selectable item availability generation computing platform 104 may include one or more processors 117, memory 118, and communication interface 119. A data bus may interconnect processor 117, memory 118, and communication interface 119. Communication interface 119 may be a network interface configured to support communication between selectable item availability generation computing platform 104 and one or more networks (e.g., network 101, or the like). Memory 118 may include one or more program modules having instructions that when executed by processor 117 cause selectable item availability generation computing platform 104 to perform one or more functions described herein and/or one or more databases that may store and/or otherwise maintain information which may be used by such program modules and/or processor 117. In some instances, the one or more program modules and/or databases may be stored by and/or maintained in different memory units of selectable item availability generation computing platform 104 and/or by different computing devices that may form and/or otherwise make up selectable item availability generation computing platform 104. For example, memory 118 may have, store, and/or include a selectable item availability generation module 118a, a selectable item availability generation database 118b, and a machine learning engine 118c. Selectable item availability generation module 118a may have instructions that direct and/or cause selectable item availability generation computing platform 104 to execute advanced selectable item availability generation techniques, as discussed in greater detail below. Selectable item availability generation database 118b may store information used by selectable item availability generation module 118a and/or selectable item availability generation computing platform 104 in selectable item availability output generation and/or in performing other functions. Machine learning engine 118c may have instructions that direct and/or cause the selectable item availability generation computing platform 104 to perform selectable item availability output generation and to set, define, and/or iteratively refine optimization rules and/or other parameters used by the selectable item availability generation computing platform 104 and/or other systems in computing environment 100.

Figure 2A:
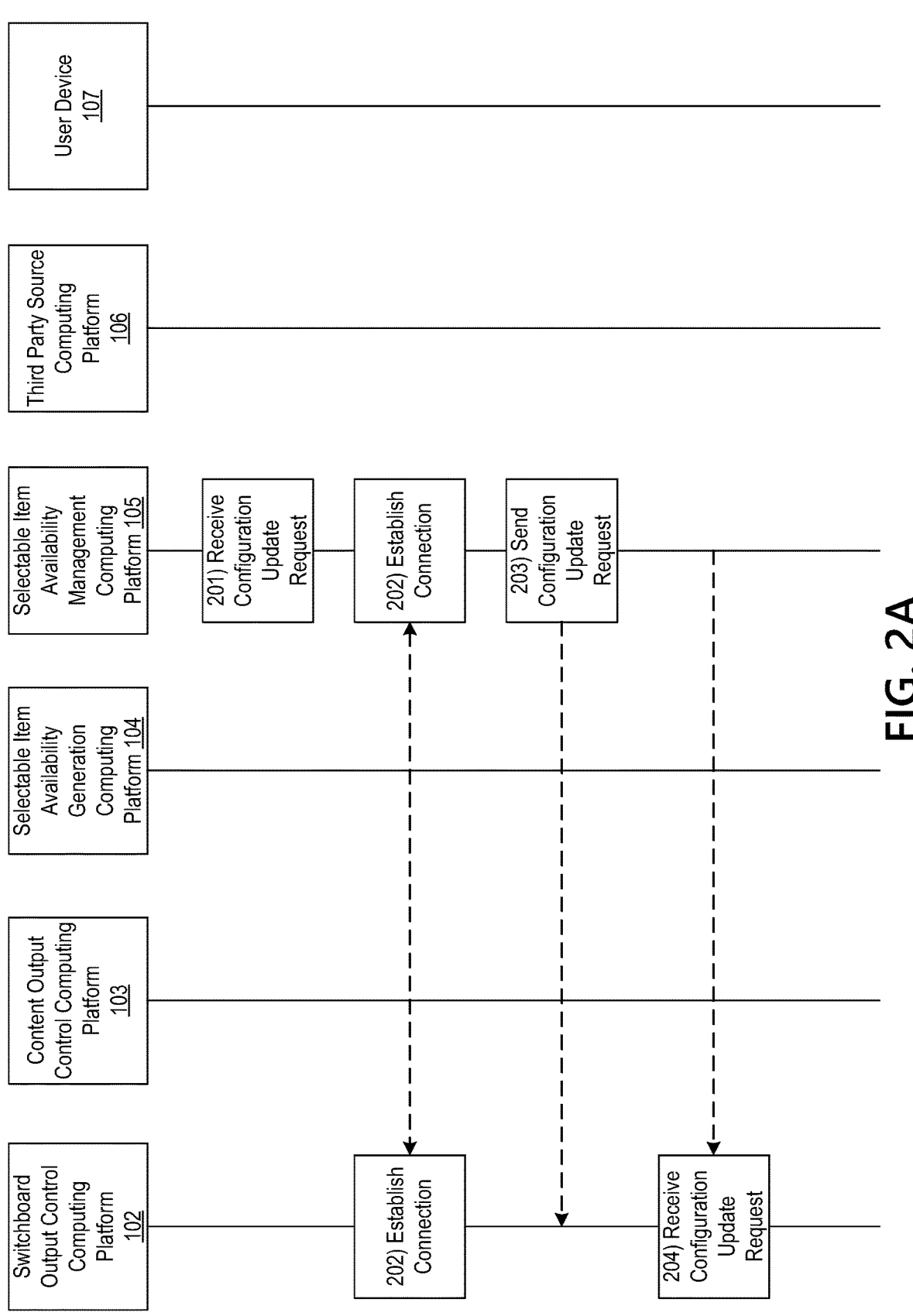
FIGS. 2A-2O depict an illustrative event sequence for deploying a switchboard output control computing platform, a content output control computing platform, and a selectable item availability generation computing platform that utilize improved selectable item availability output generation techniques in accordance with one or more example arrangements discussed herein.
Figure 2B:
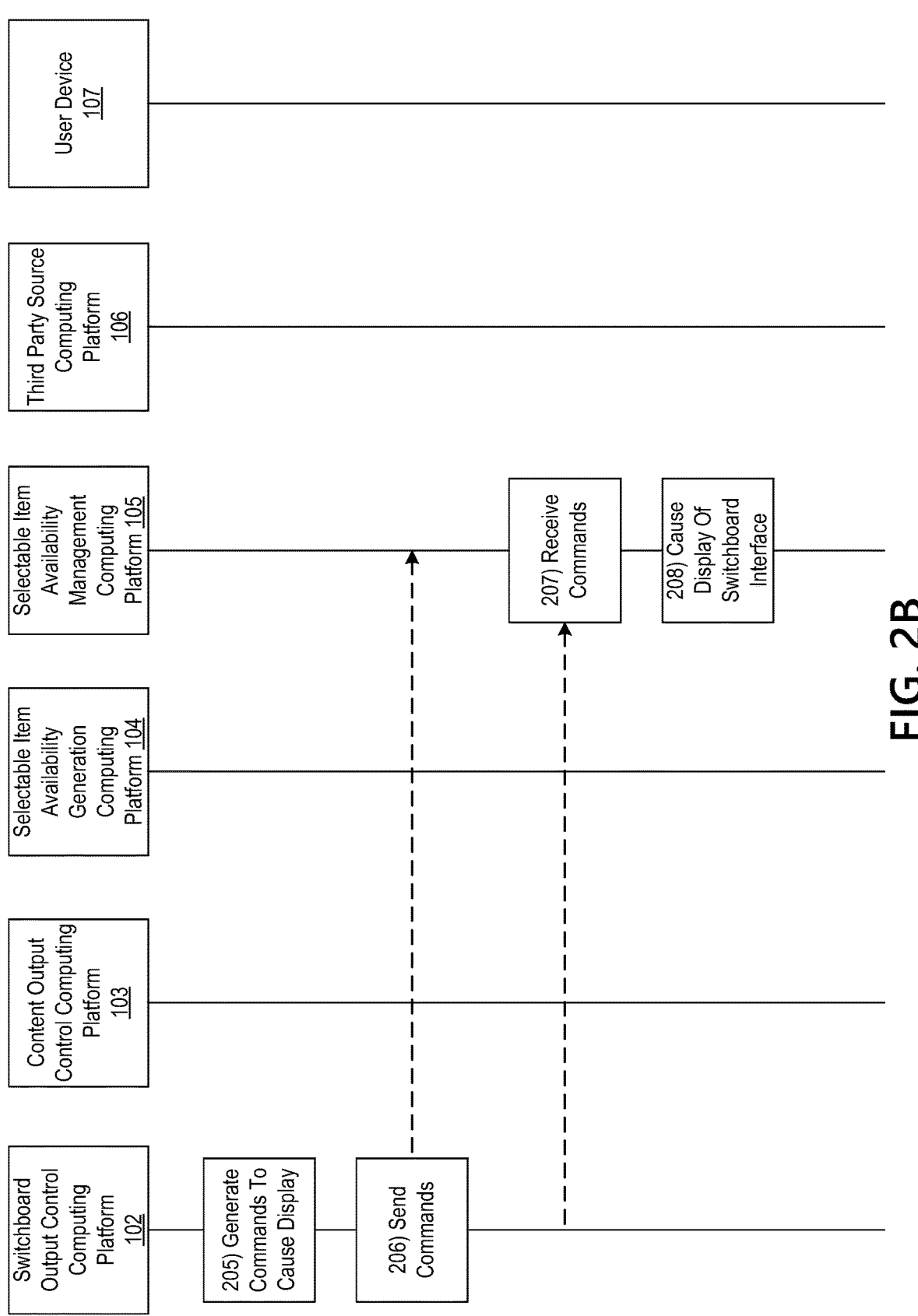
Figure 2C:
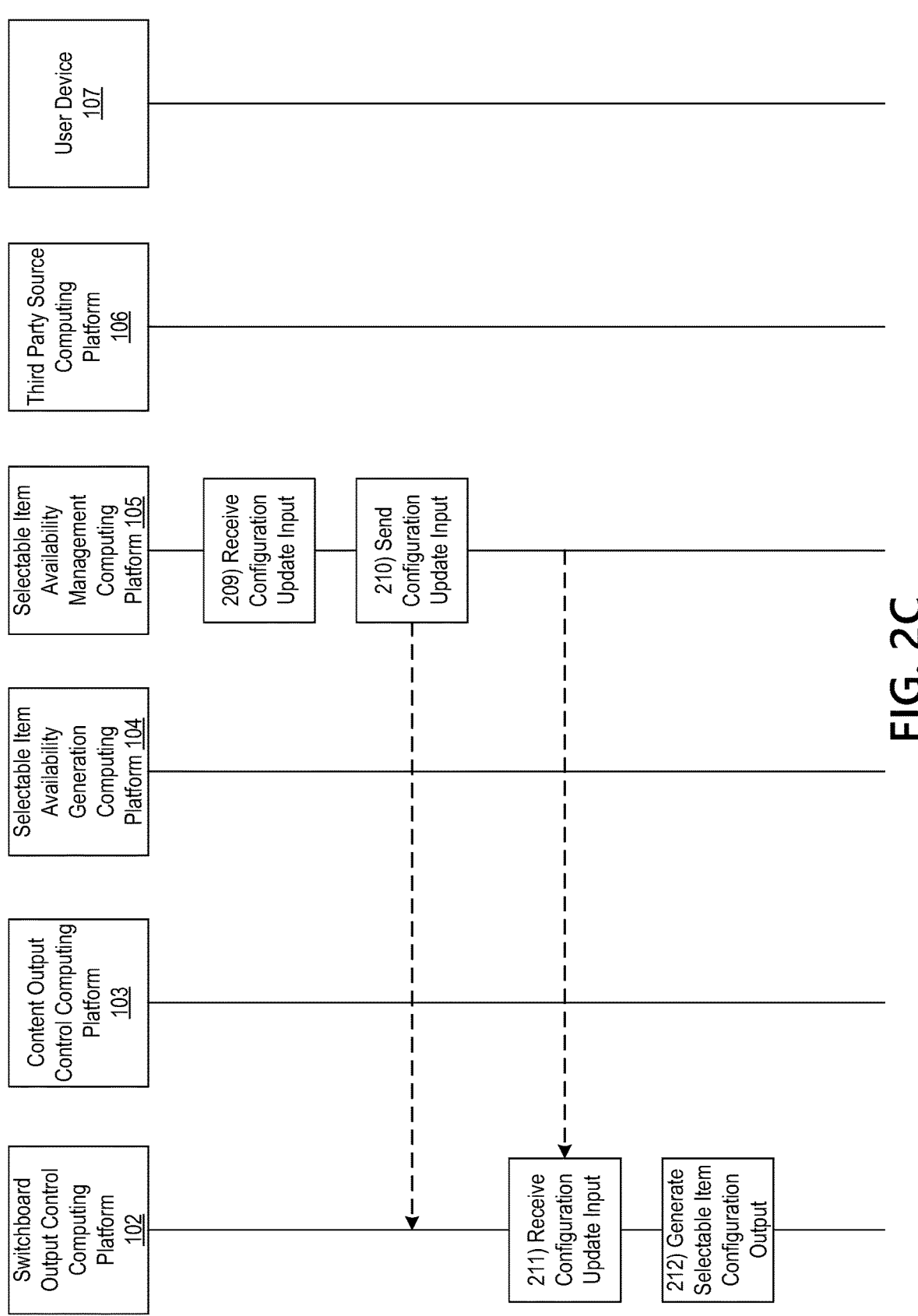
Figure 2D:
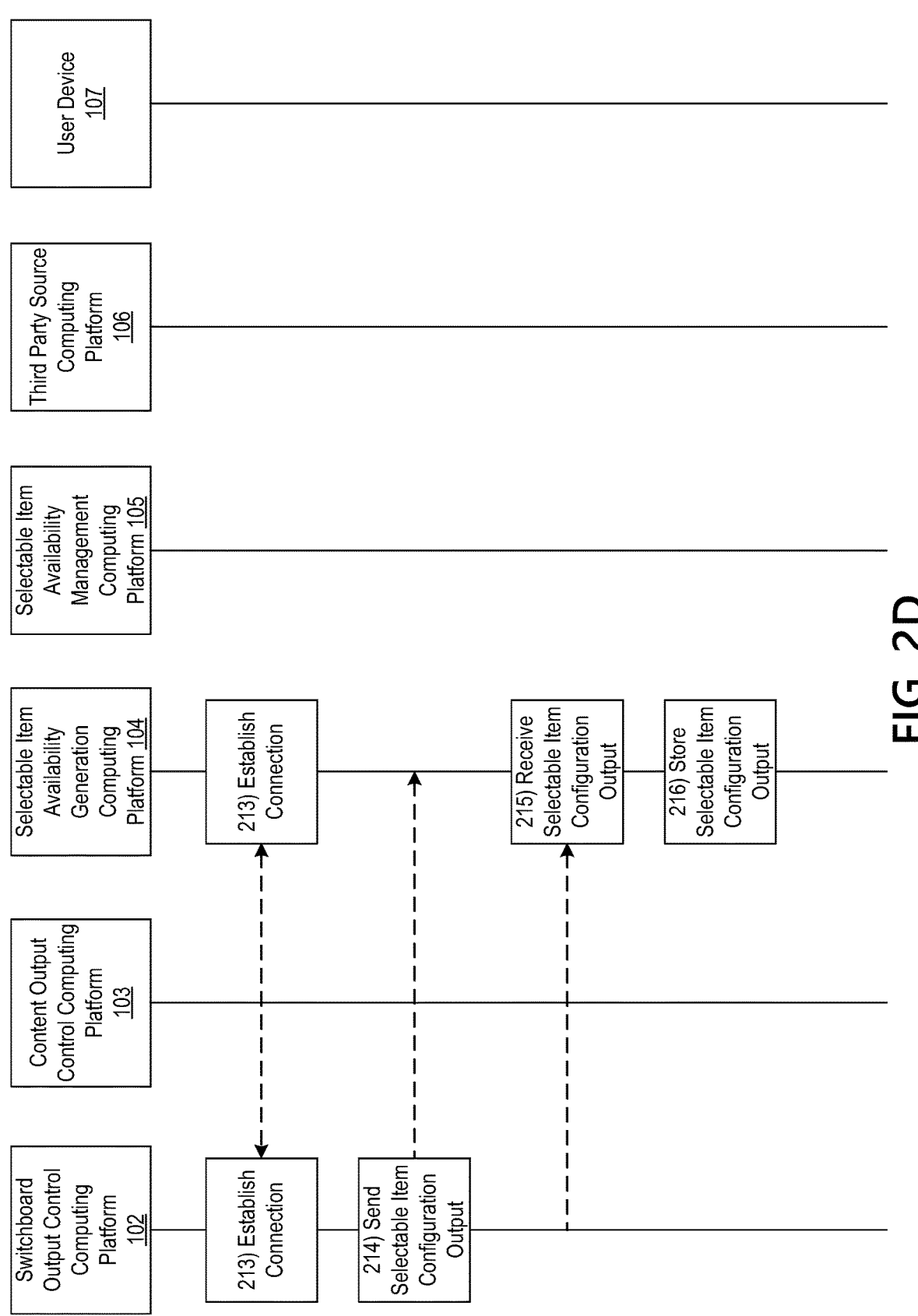
Figure 2E:
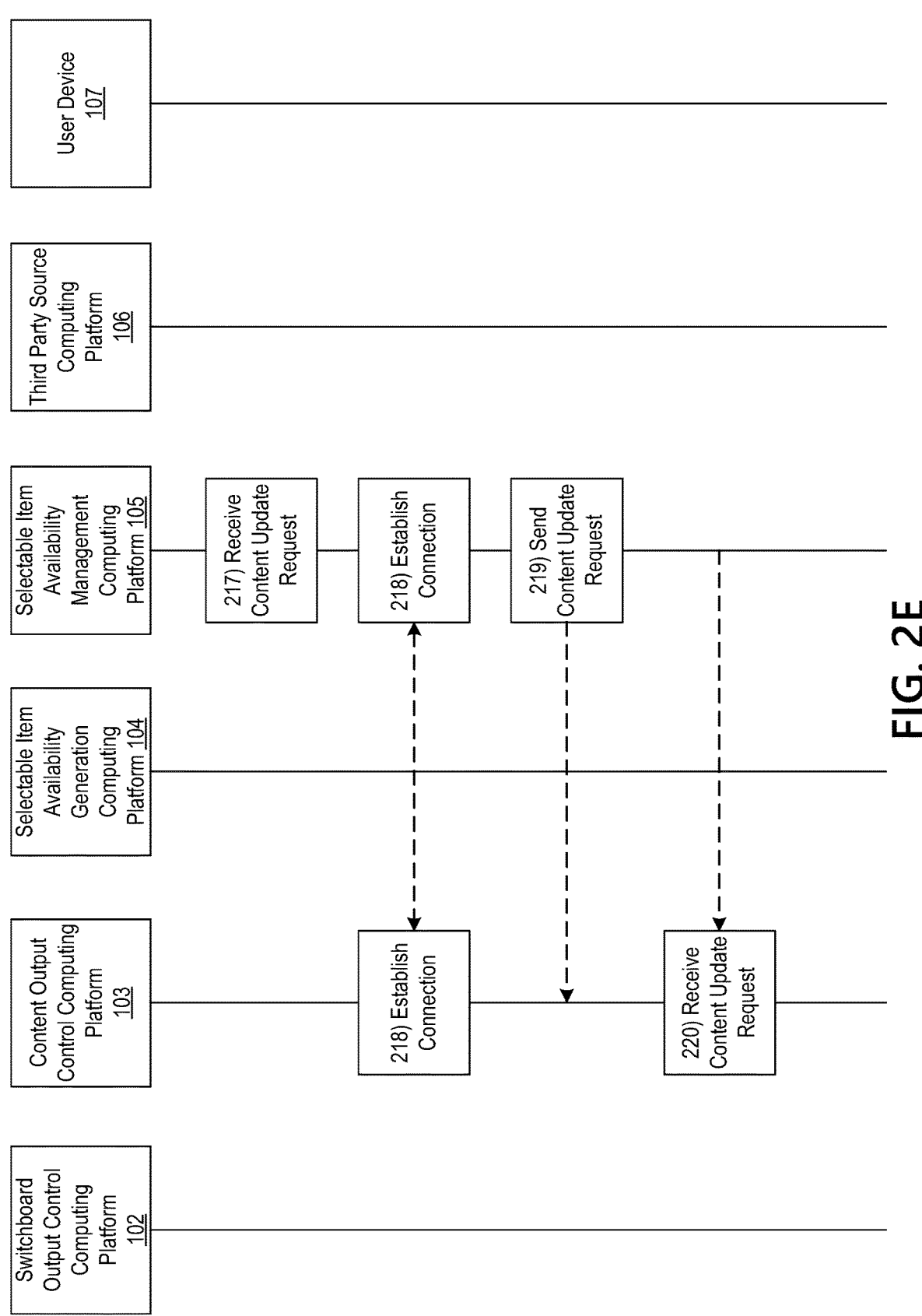
Figure 2F:
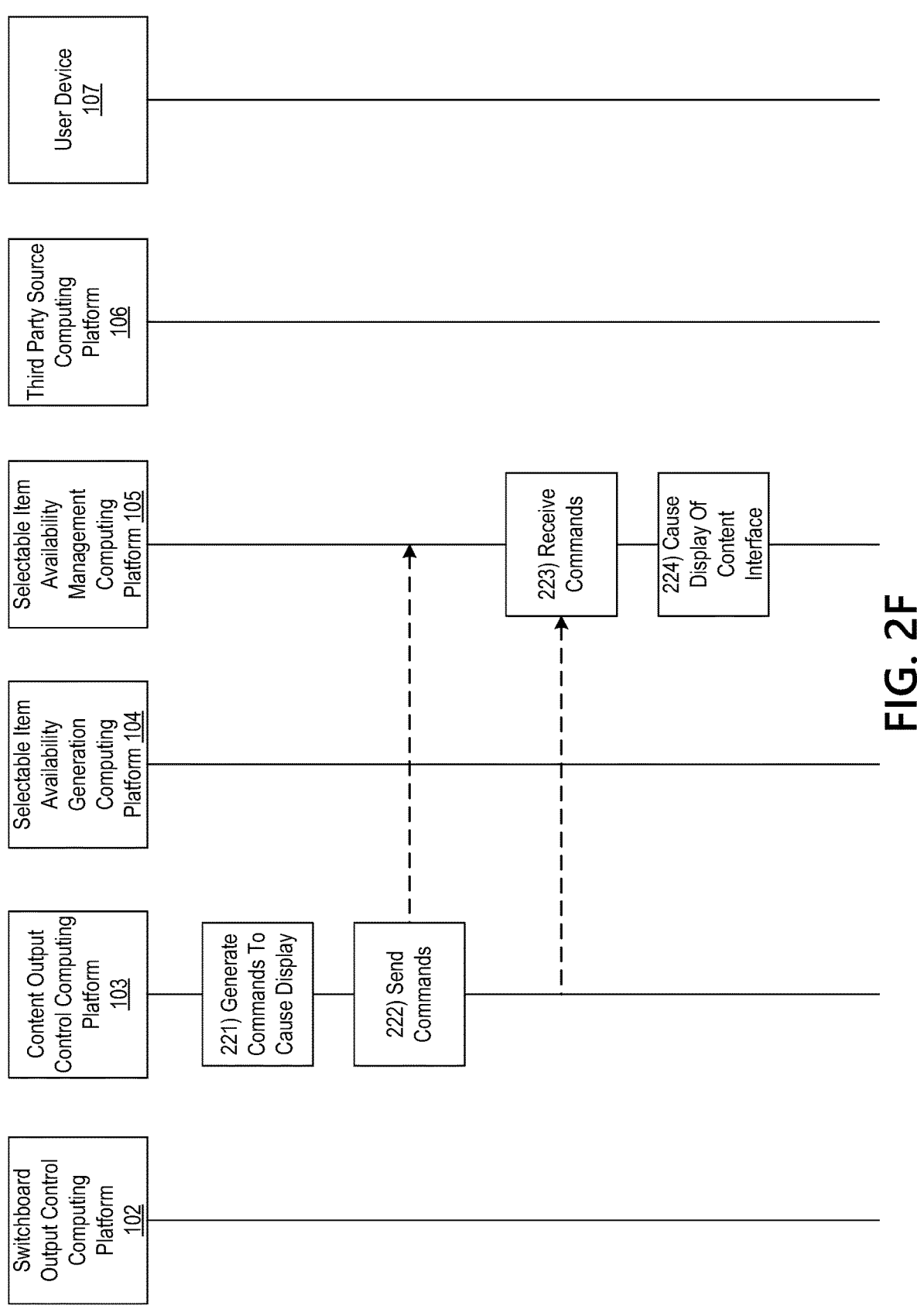
Figure 2G:
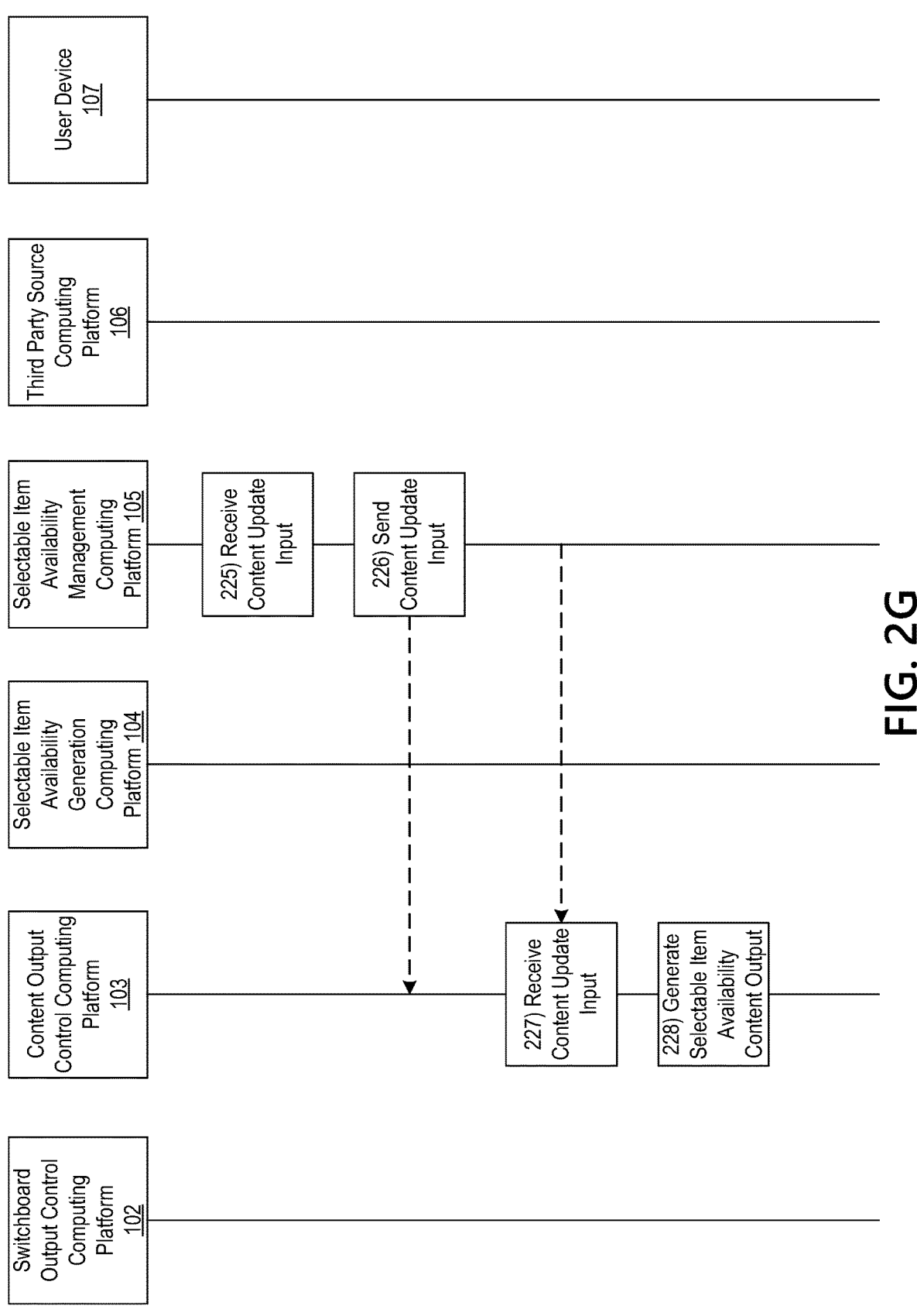
Figure 2H:
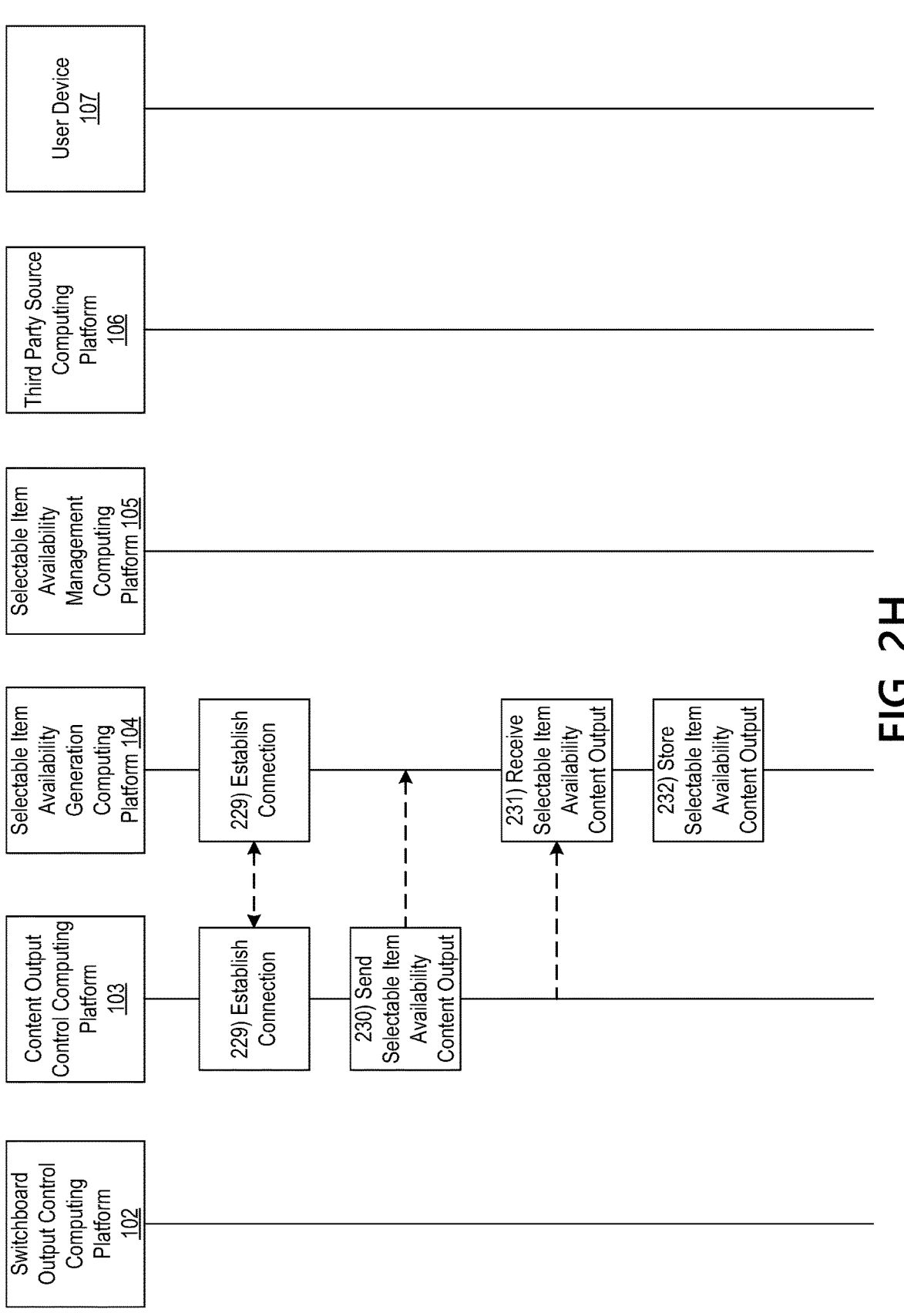
Figure 21:
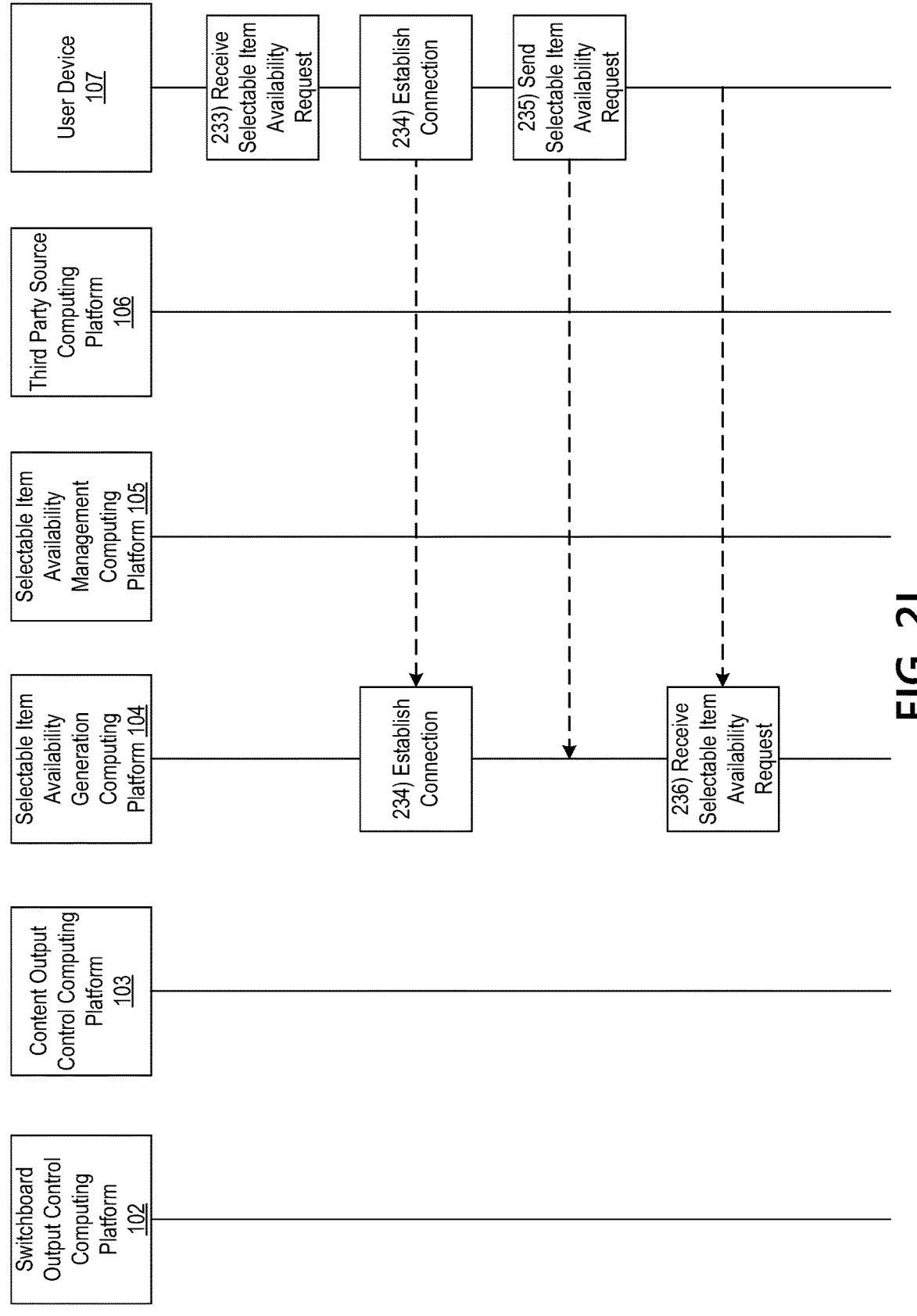
Figure 2J:
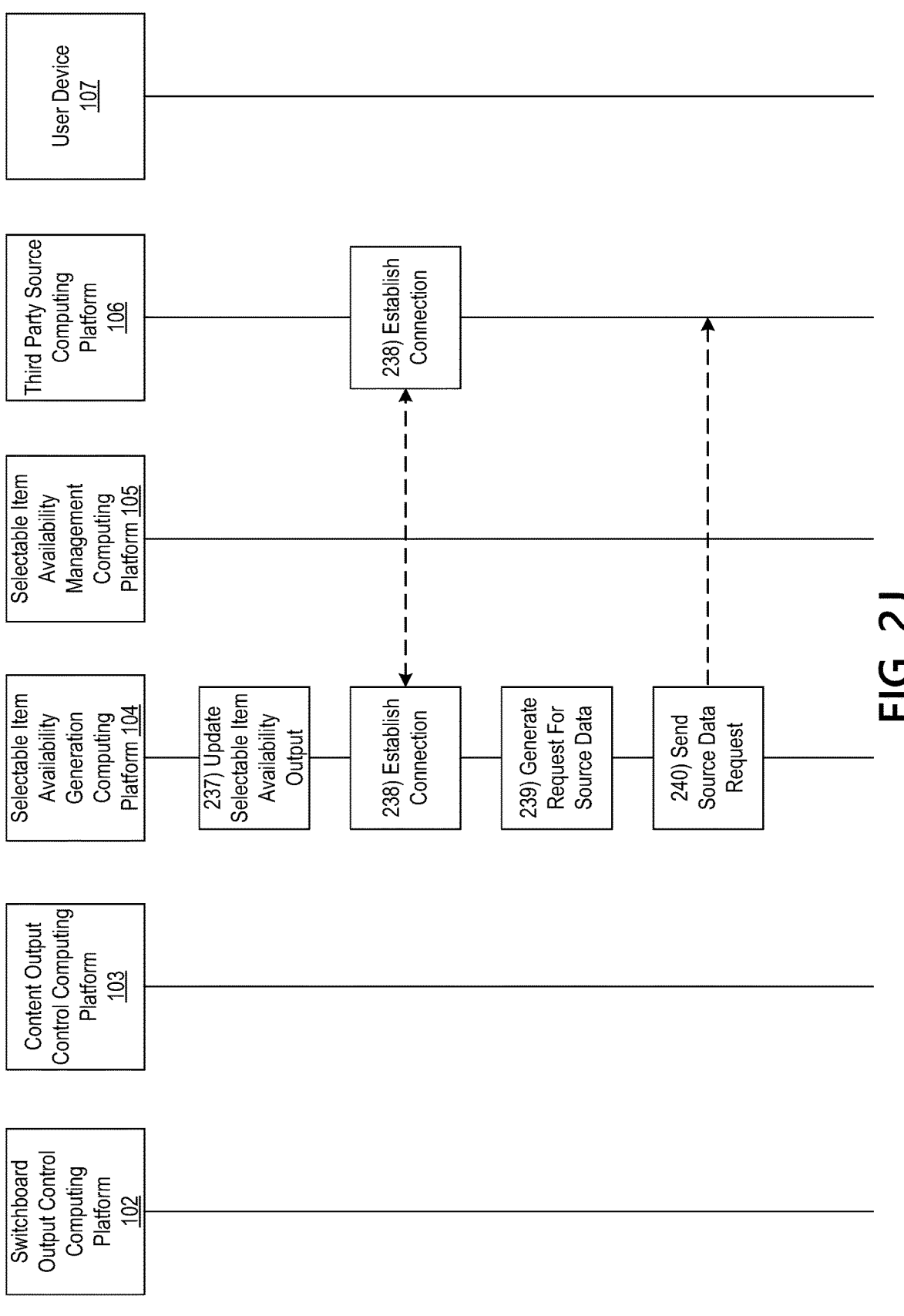
Figure 2K:
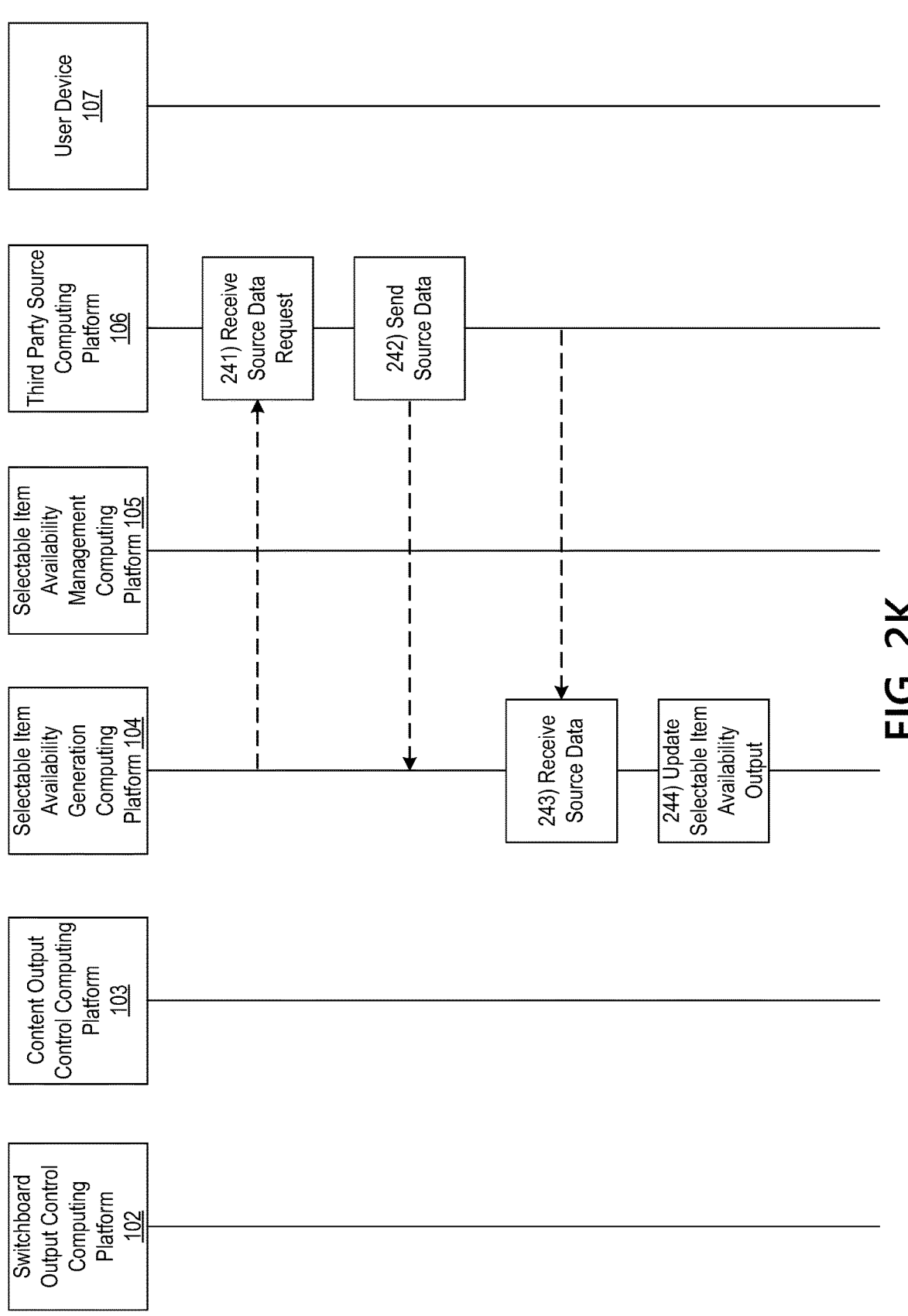
Figure 2L:
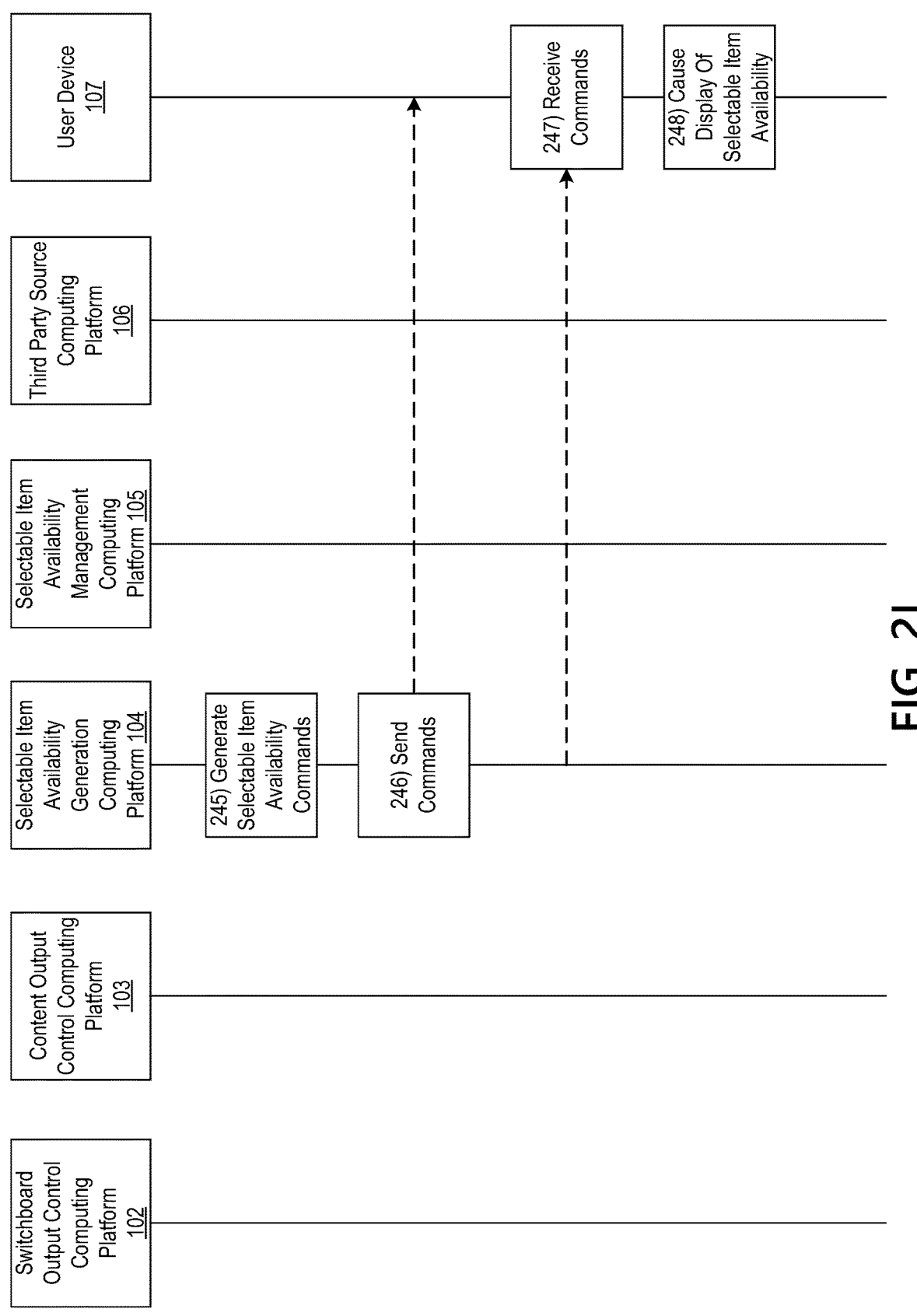
Figure 2M:
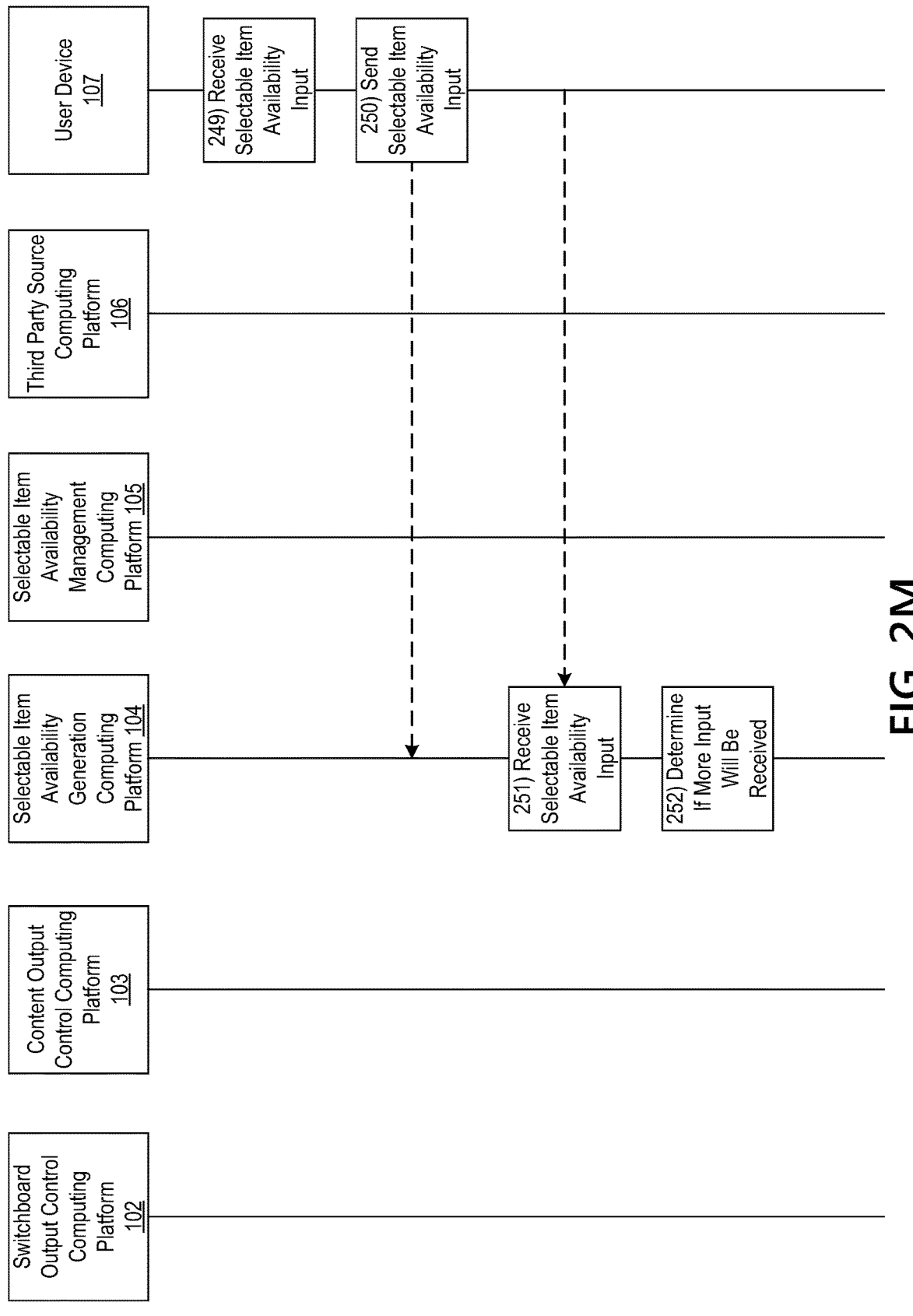
Figure 2N:
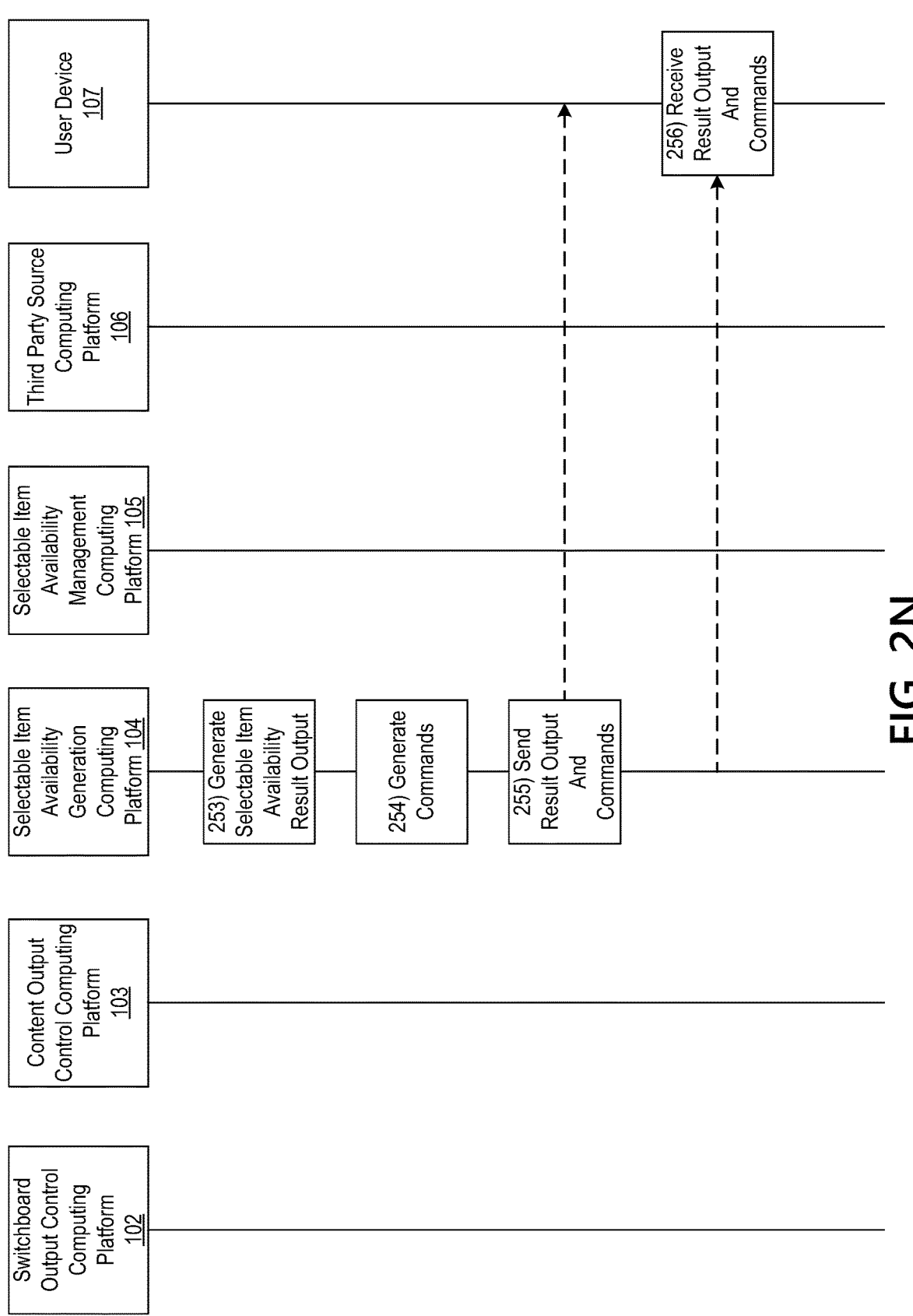
Figure 2O:
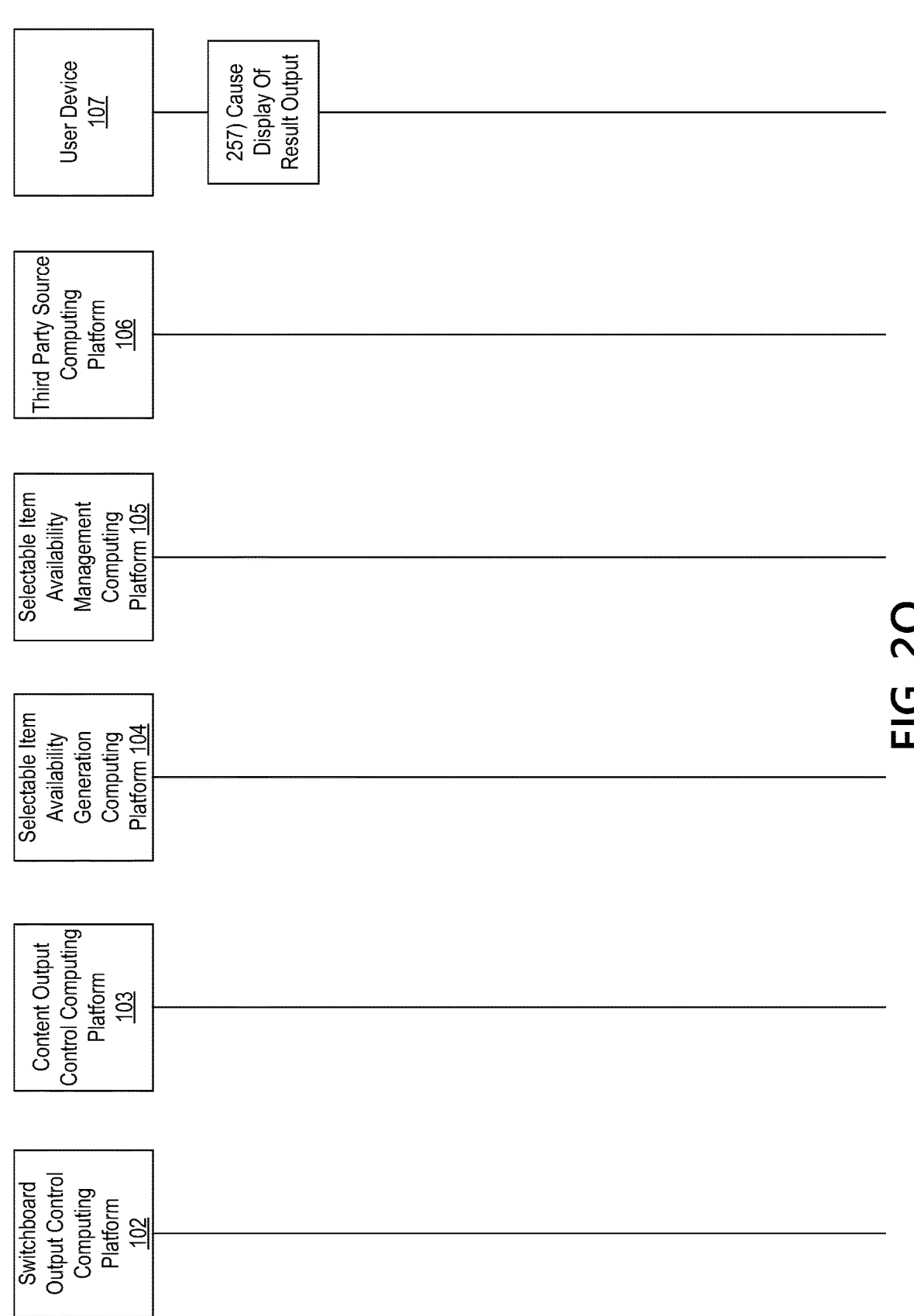

FIGS. 2A-2O depict an illustrative event sequence for deploying a selectable item availability generation computing platform 104 that utilizes improved selectable item availability output generation techniques in accordance with one or more example embodiments. Referring to FIG. 2A, at step 201, the selectable item availability management computing platform 105 may receive a selectable item availability configuration update request. For example, the selectable item availability management computing platform 105 may receive, via a user interface displayed on a display comprising the selectable item availability management computing platform 105, a user input requesting a configuration update to a selectable item availability output. The selectable item availability output may comprise one or more user interfaces that allow a user to provide personal information.

At step 202, the selectable item availability management computing platform 105 may establish a connection with the switchboard output control computing platform 102. For example, the selectable item availability management computing platform 105 may establish a first wireless data connection to the switchboard output control computing platform 102 to link the selectable item availability management computing platform 105 to the switchboard output control computing platform 102.

At step 203, the selectable item availability management computing platform 105 may send the selectable item availability configuration update request. For example, the selectable item availability management computing platform 105 may send, while the first wireless data connection is established and via the first wireless data connection, the selectable item availability configuration update request to the switchboard output control computing platform 102.

At step 204, the switchboard output control computing platform 102 may receive the selectable item availability configuration update request. For example, the switchboard output control computing platform 102 may receive, via the first wireless data connection and from the selectable item availability management computing device, the selectable item availability configuration update request.

Referring to FIG. 2B, at step 205, the switchboard output control computing platform 102 may generate one or more commands directing the selectable item availability management computing platform 105 to cause display of a switchboard interface output. For example, the switchboard output control computing platform 102 may generate the one or more commands in response to receiving the selectable item availability configuration update request at step 204.

At step 206, the switchboard output control computing platform 102 may send, via the communication interface 113, via the first wireless data connection, and to the selectable item availability management computing platform 105, the one or more commands directing the selectable item availability management computing platform 105 to cause display of the switchboard interface output.

At step 207, the selectable item availability management computing platform 105 may receive the one or more commands directing the selectable item availability management computing platform 105 to cause display of the switchboard interface output. For example, the selectable item availability management computing platform 105 may receive the one or more commands via the first wireless data connection and from the switchboard output control computing platform 102.

Figure 3:
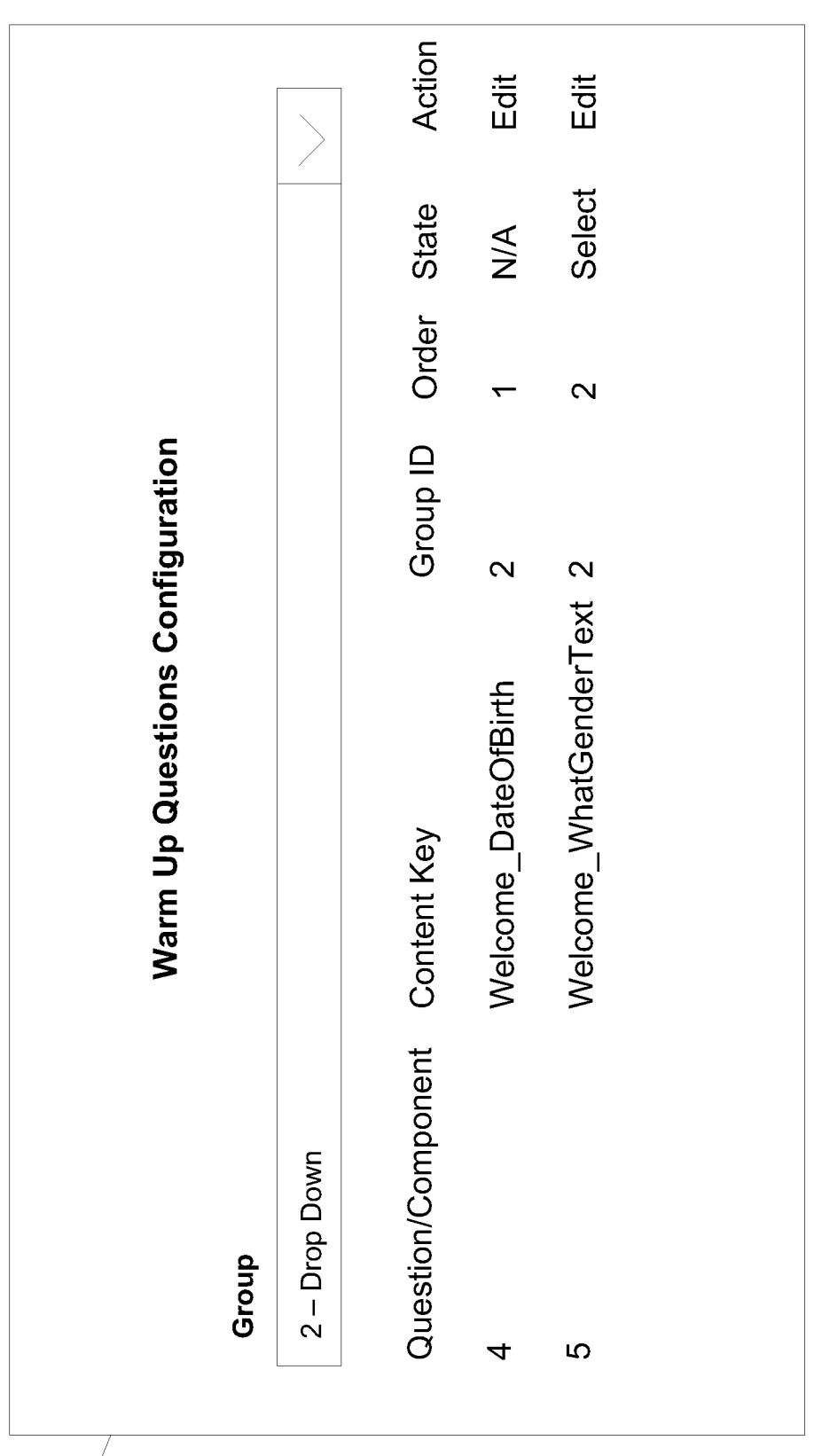
FIGS. 3-5 depict example graphical user interfaces for a switchboard output control computing platform, a content output control computing platform, and a selectable item availability generation computing platform that utilize improved selectable item availability output generation techniques in accordance with one or more example arrangements discussed herein.

At step 208, the selectable item availability management computing platform 105 may cause display of the switchboard interface output. For example, the selectable item availability management computing platform 105 may cause display of the switchboard interface output in response to receiving the one or more commands at step 207. For example, the selectable item availability management computing platform 105 may display and/or otherwise present a graphical user interface similar to graphical user interface 305, which is illustrated in FIG. 3. The switchboard interface output may allow a user to select a particular group of elements and to modify the configuration of those elements. For example, the selectable item availability management computing platform 105 may receive a user input requesting that a user interface comprising the selectable item availability output prompts a user for his or her gender prior to prompting for a date of birth. In another example, the selectable item availability management computing platform 105 may receive a user input requesting that the user interface prompts a user to select a gender via a drop down menu (as opposed to typing it in, selecting a button, or the like). The selectable item availability management computing platform 105 may receive this user input via the group identifier field. The selectable item availability management computing platform 105 may also receive user input to vary particular questions by state and/or otherwise to modify their configuration on the selectable item availability output. In some examples, the selectable item availability management computing platform 105 may receive input to delete, move, change, or otherwise revise particular elements of various user interfaces comprising the selectable item availability output.

The selectable item availability management computing platform 105 may also receive user input to edit one or more of the following: one or more of the levels of coverage (limits, deductibles, options, or the like) for various plans, scenarios for which a stop page is displayed to a user, which products are live in each state, which sections to display to a user based on personal information, which zip codes customers are able to purchase insurance for, dog breeds that may trigger a stop page, which protective devices are displayed to a user, page order or question group order, values displayed in dropdowns, values for state level indicators on a state by state basis, restrictions applied to renter counties, changes to an environment via a product release, and the like. The selectable item availability management computing platform 105 may also receive user input to navigate to different utility tools.

By allowing a user to edit the configuration of the selectable item availability output via the switchboard interface, the user may avoid having to request that the selectable item availability output be recoded to show the revised configuration. This may save a considerable amount of time.

Referring to FIG. 2C, at step 209, as described above with regard to FIG. 3, the selectable item availability management computing platform 105 may receive a selectable item availability configuration update input. For example, the selectable item availability configuration update input may comprise an indication to move, delete, add, and/or otherwise edit elements and their configuration comprising the selectable item availability output as described above at step 208.

At step 210, the selectable item availability management computing platform 105 may send the selectable item availability configuration update input to the switchboard output control computing platform 102. For example, the selectable item availability management computing platform 105 may send, via the first wireless data connection and to the switchboard output control computing platform 102, the selectable item availability configuration update input.

At step 211, the switchboard output control computing platform 102 may receive the selectable item availability configuration update input. For example, the switchboard output control computing platform 102 may receive, via the first wireless data connection, the selectable item availability configuration update input sent by the selectable item availability management computing platform 105 at step 210.

At step 212, the switchboard output control computing platform 102 may generate a selectable item availability configuration output. For example, the switchboard output control computing platform 102 may generate, based on the selectable item availability configuration update input received at step 211, the selectable item availability configuration output. In generating the selectable item availability configuration output, the switchboard output control computing platform 102 may generate configuration data that may be used to cause a user interface to show the requested configuration change indicated by the selectable item availability configuration update input. For example, the switchboard output control computing platform 102 may generate configuration data indicating that on a marital status should be selected, using the selectable item availability output, via a drop down menu as opposed to typed into a text box.

The switchboard output control computing platform 102 may also generate, based on the selectable item availability configuration update input, selectable item availability configuration outputs that edit one or more of the levels of coverage (limits, deductibles, options, or the like) for various plans, scenarios for which a stop page is displayed to a user, which products are live in each state, which sections to display to a user based on personal information, which zip codes customers are able to purchase insurance for, dog breeds that may trigger a stop page, which protective devices are displayed to a user, page order or question group order, values displayed in dropdowns, values for state level indicators on a state by state basis, restrictions applied to renter counties, changes to an environment via a product release, and the like.

Referring to FIG. 2D, at step 213, the switchboard output control computing platform 102 may establish, with the selectable item availability generation computing platform 104, a connection. For example, the switchboard output control computing platform 102 may establish a second wireless data connection with the selectable item availability generation computing platform 104.

At step 214, the switchboard output control computing platform 102 may send the selectable item availability configuration output, generated at step 212, to the selectable item availability generation computing platform 104. For example, the switchboard output control computing platform 102 may send, to the selectable item availability generation computing platform 104, while the second wireless data connection is established, via the communication interface 113, and via the second wireless data connection, the selectable item availability configuration output. For example, the switchboard output control computing platform 102 may establish the second wireless data connection to the selectable item availability generation computing platform 104 to link the switchboard output control computing platform 102.

At step 215, the selectable item availability generation computing platform 104 may receive the selectable item availability configuration output. For example, the selectable item availability generation computing platform 104 may receive, via the communication interface 119, via the second wireless data connection and from the switchboard output control computing platform 102, the selectable item availability configuration output.

In some examples, by receiving the selectable item available configuration output, the selectable item availability generation computing platform 104 may receive one or more commands directing the selectable item availability generation computing platform 104 to update a configuration corresponding to the selectable item availability output. For example, the selectable item availability generation computing platform 104 may receive one or more commands directing it to modify an order of questions displayed on the selectable item availability output. In another example, the selectable item availability generation computing platform 104 may receive one or more commands directing it to modify a group of states in which a particular question is displayed on the selectable item availability output. In yet another example, the selectable item availability generation computing platform may receive one or more commands directing it to modify a drop down menu on the selectable item availability output to be a text box capable of receiving user input corresponding to an answer to a question.

At step 216, the selectable item availability generation computing platform 104 may store the selectable item availability configuration output. In some examples, in response to receiving the selectable item availability configuration output, the selectable item availability generation computing platform 104 may update the selectable item availability output. In other examples, the selectable item availability generation computing platform 104 wait to update the selectable item availability output until receiving a request for the selectable item availability output. In yet other examples, the selectable item availability generation computing platform 104 may determine based on the selectable item availability configuration output whether to start updating now or later. For example, if selectable item availability generation computing platform 104 determines that the update is below a predetermined complexity threshold, the selectable item availability generation computing platform 104 may wait to update the selectable item availability output. If the selectable item availability generation computing platform 104 determines that the update is above a predetermined complexity threshold, the selectable item availability generation computing platform 104 may initiate the update.

Referring to FIG. 2E, at step 217, the selectable item availability management computing platform 105 may receive a selectable item availability content update request. For example, the selectable item availability management computing platform 105 may receive a request to update content comprising the selectable item availability output.

At step 218, the selectable item availability management computing platform 105 may establish a connection with the content output control computing platform 103. For example, the selectable item availability management computing platform 105 may establish a third wireless data connection with the content output control computing platform 103. For example, the selectable item availability management computing platform 105 may establish the third wireless data connection to the selectable item availability management computing platform 105 to link the selectable item availability management computing platform 105 to the content output control computing platform 103.

At step 219, the selectable item availability management computing platform 105 may send the selectable item availability content update request to the content output control computing platform 103. The selectable item availability management computing platform 105 may send, while the third wireless data connection is established, via the third wireless data connection, and to the content output control computing platform 103, the selectable item availability content update request.

At step 220, the content output control computing platform 103 may receive the selectable item availability content update request sent at step 219. For example, the content output control computing platform 103 may receive, via the communication interface 116, via the third wireless data connection and from the selectable item availability management computing platform 105, the selectable item availability content update request.

Referring to FIG. 2F, at step 221, the content output control computing platform 103 may generate one or more commands directing the selectable item availability management computing platform 105 to cause display of a content interface output. The content output control computing platform 103 may generate the one or more commands in response to receiving the selectable item availability content update request at step 220.

At step 222, the content output control computing platform 103 may send, to the selectable item availability management computing platform 105, the one or more commands to cause display of the content interface output. For example, the content output control computing platform 103 may send, via the communication interface 116, via the third wireless data connection and to the selectable item availability management computing platform 105, the one or more commands.

At step 223, the selectable item availability management computing platform 105 may receive the one or more commands to cause display of the content interface output. For example, the selectable item availability management computing platform 105 may receive, via the third wireless data connection and from the content output control computing platform 103, the one or more commands.

Figure 4:
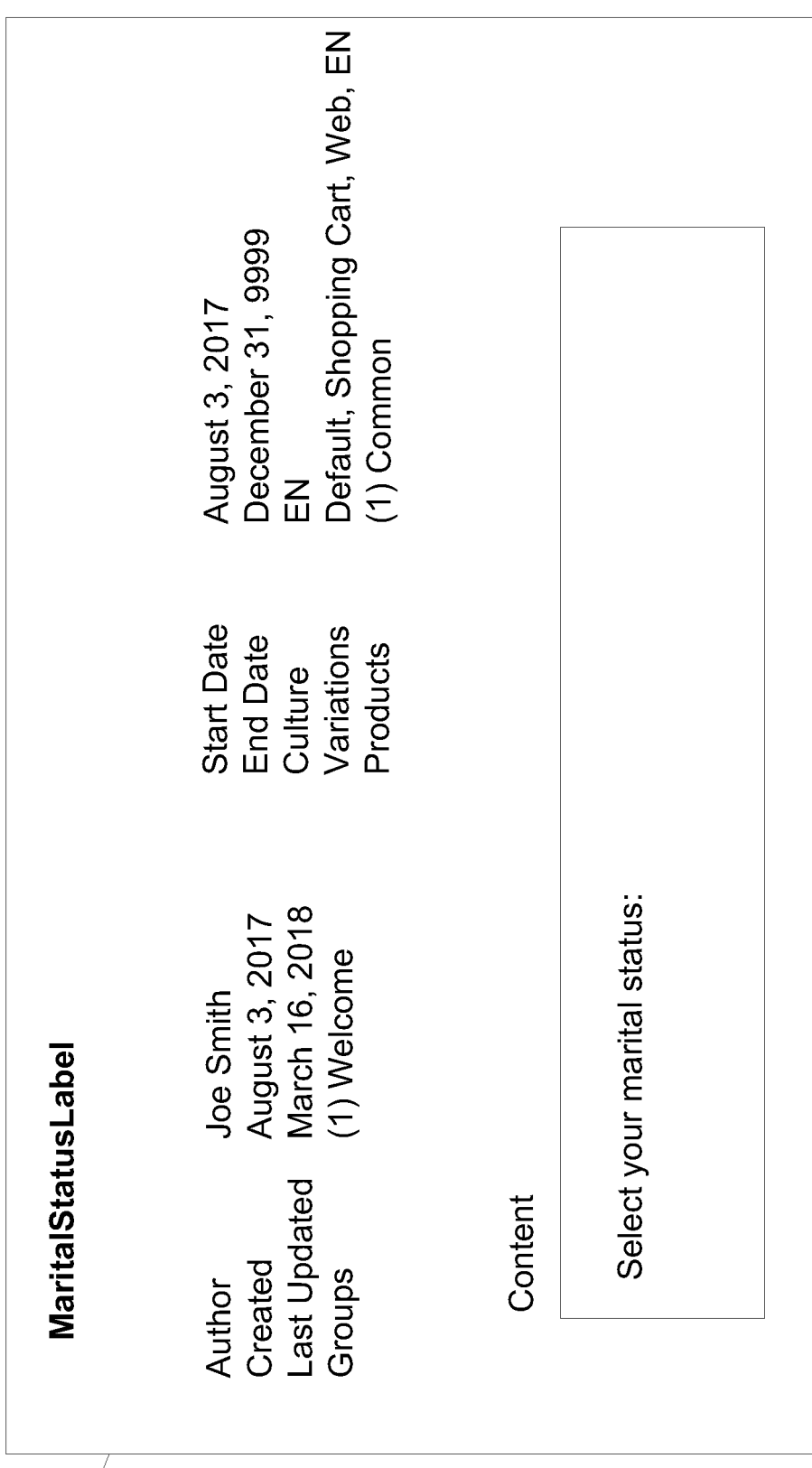

At step 224, the selectable item availability management computing platform 105 may cause display of the content interface output. For example, the selectable item availability management computing platform 105 may cause display of the content interface output in response to receiving the one or more commands at step 223. For example, the selectable item availability management computing platform 105 may display and/or otherwise present a graphical user interface similar to graphical user interface 405, which is illustrated in FIG. 4. The content interface output may allow a user to edit particular content displayed on the selectable item availability output. For example, the selectable item availability management computing platform 105 may receive a user input requesting that a user interface comprising the selectable item availability output prompts a user for his or her marital status by displaying "Select your marital status," instead of "Are you married?" In another example, the selectable item availability management computing platform 105 may receive a user input requesting that the user interface is displayed in Spanish instead of English. In yet another example, the selectable item availability management computing platform 105 may receive an input to change particular video content that is displayed via the selectable item availability output. In yet another example, the selectable item availability management computing platform 105 may receive an input to change a product with which video or text is associated. The content interface output may allow a user to vary content based on state, product, device, language, application, and the like. By allowing a user to edit the content of the selectable item availability output via the content interface output, the user may avoid having to request that the selectable item availability output be recoded to show the revised content. This may save a considerable amount of time.

Referring to FIG. 2G, at step 225, the selectable item availability management computing platform 105 may receive a selectable item availability content update input. For example, the selectable item availability management computing platform 105 may receive a user input via the content interface output as described above with regard to FIG. 4.

At step 226, the selectable item availability management computing platform 105 may send the selectable item availability content update input to the content output control computing platform 103. For example, the selectable item availability management computing platform 105 may send, via the third wireless data connection and to the content output control computing platform 103, the selectable item availability content update input.

At step 227, the content output control computing platform 103 may receive the selectable item availability content update input. For example, the content output control computing platform 103 may receive, via the communication interface 116, via the third wireless data connection and from the selectable item availability management computing platform 105, the selectable item availability content update input sent at step 226.

At step 228, the content output control computing platform 103 may generate a selectable item availability content output. For example, the content output control computing platform 103 may generate, based on the selectable item availability content update input received at step 227, the selectable item availability content output. In generating the selectable item availability content output, the content output control computing platform 103 may generate content data that may be used to cause a user interface to show the requested content change indicated by the selectable item availability content update input. For example, the content output control computing platform 103 may generate content data indicating that a marital status should be prompted for by the text "Select your marital status," instead of "Are you married?"

Referring to FIG. 2H, at step 229, the content output control computing platform 103 may establish a connection with the selectable item availability generation computing platform 104. For example, the content output control computing platform 103 may establish a fourth wireless data connection with the selectable item availability generation computing platform 104 to link the content output control computing platform 103 to the selectable item availability generation computing platform 104.

At step 230, the content output control computing platform 103 may send the selectable item availability content output to the selectable item availability generation computing platform 104. For example, the content output control computing platform 103 may send, while the fourth wireless data connection is established, via the communication interface 116, via the fourth wireless data connection, and to the selectable item availability generation computing platform 104, the selectable item availability content output.

At step 231, the selectable item availability generation computing platform 104 may receive the selectable item availability content output sent at step 230. For example, the selectable item availability generation computing platform 104 may receive the selectable item availability content output via the fourth wireless data connection, via the communication interface 119, and from the content output control computing platform 103.

At step 232, the selectable item availability generation computing platform 104 may store the selectable item availability content output received at step 231. In some examples, in response to receiving the selectable item availability content output, the selectable item availability generation computing platform 104 may update the selectable item availability output. In other examples, the selectable item availability generation computing platform 104 wait to update the selectable item availability output until receiving a request for the selectable item availability output. In yet other examples, the selectable item availability generation computing platform 104 may determine based on the selectable item availability content output whether to start updating now or later. For example, if selectable item availability generation computing platform 104 determines that the update is below a predetermined complexity threshold, the selectable item availability generation computing platform 104 may wait to update the selectable item availability output. If the selectable item availability generation computing platform 104 determines that the update is above a predetermined complexity threshold, the selectable item availability generation computing platform 104 may initiate the update.

With reference to FIG. 2I, referring to step 233, the user device 107 may receive a selectable item availability request. For example the user device may receive a user input indicating that a user would like to access the selectable item availability output (which may be an online tool for purchasing insurance products and the like).

At step 234, the user device 107 may establish a connection with the selectable item availability generation computing platform 104. For example, the user device 107 may establish a fifth wireless data connection with the selectable item availability generation computing platform 104 to link the user device 107 to the selectable item availability generation computing platform 104.

At step 235, the user device 107 may send the selectable item availability request to the selectable item availability generation computing platform 104. For example, the user device 107 may send, while the fifth wireless data connection is established, via the fifth wireless data connection, and to the selectable item availability generation computing platform 104, the selectable item availability request.

At step 236, the selectable item availability generation computing platform 104 may receive the selectable item availability request. For example, the selectable item availability generation computing platform 104 may receive, from the user device 107, via the communication interface 119, and via the fifth wireless data connection, the selectable item availability request sent at step 235.

Referring to FIG. 2J, at step 237, the selectable item availability generation computing platform 104 may update the selectable item availability output. For example, if the selectable item availability output was not previously updated as described above at steps 216 and 232, the selectable item availability generation computing platform 104 may update the selectable item availability output based on stored selectable item availability configuration outputs and selectable item availability content outputs. For example, in updating the selectable item availability output, the selectable item availability generation computing platform 104 may update user interface content and configurations comprising the selectable item availability output that were requested by the selectable item availability management computing platform 105.

In addition, the selectable item availability generation computing platform 104 may update one or more user interfaces comprising the selectable item availability output based on user input received via a previous user interface comprising the selectable item availability output. For example, the selectable item availability generation computing platform 104 may update, using machine learning algorithms and datasets, one or more user interfaces comprising the selectable item availability output. For example, if a user previously provided an address and clicked "Next" on a user interface comprising the selectable item availability output, the selectable item availability generation computing platform 104 may update the selectable item availability output to comprise a subsequent user interface. For example, the selectable item availability generation computing platform 104 may receive a zip code via a selectable item availability input, and may determine that a user selected "Next" on the previous user interface. In this example, the selectable item availability generation computing platform 104 may update the selectable item availability output to cause display of a subsequent user interface comprising the selectable item availability output. For example, the subsequent user interface may comprise prompts for the user's name, address, other information as described below with regard to FIG. 5, or the like. In another example, based on a zip code received via a selectable item availability input, the selectable item availability generation computing platform 104 may determine a state and a background scenery associated with the zip code. The selectable item availability generation computing platform 104 may cause the state to move to the forefront of one or more subsequent user interfaces comprising the selectable item availability output, and may cause the fill of the state to comprise the background scenery. For example, a user may enter a zip code associated with a rural town in Illinois, and the selectable item availability generation computing program may cause Illinois to move to the forefront of the subsequent user interfaces comprising the selectable item availability output, and may cause the state to be filled with a rural background (farm fields or the like). In determining the background scenery, the selectable item availability generation computing platform 104 may determine, for example, a pacific north west background, a mountain background, a south west background, a mid-west background, a Texas background, a New England background, a mid-Atlantic background, a south east background, a city background, or the like.

In another example, based on the background scenery determined via a selectable item availability input, the selectable item availability generation computing platform 104 may determine that subsequent user interfaces comprising the selectable item availability output should use the determined background scenery as a background for the user interface (as opposed to just the fill for the state). In this example, the selectable item availability generation computing platform 104 may update the selectable item availability output based on the determined background scenery.

In yet another example, based on a vehicle make and model determined via a selectable item availability input, the selectable item availability generation computing platform 104 may determine that subsequent user interfaces should use the determined vehicle driving through the determined background scenery as a background for the user interfaces. In this example, the selectable item availability generation computing platform 104 may update the selectable item availability output based on the determined vehicle and the determined background scenery.

In other examples, the selectable item availability generation computing platform 104 may update the selectable item availability output based on user input received via a current user interface comprising the selectable item availability output. For example, the selectable item availability generation computing platform 104 may receive a selectable item availability input indicating a model and body style of a vehicle. The selectable item availability generation computing platform 104 may update a currently displayed user interface comprising the selectable item availability output to display the determined vehicle (as opposed to just the vehicle frame). In another example, the selectable item availability generation computing platform 104 may receive a selectable item availability input indicated that the vehicle was new when the user purchased it. In this example, the selectable item availability generation computing platform 104 may update a currently displayed user interface comprising the selectable item availability output to display plus signs floating around the vehicle. In yet another example, the selectable item availability generation computing platform 104 may receive a selectable item availability input indicating that a home has a garage. In this example, the selectable item availability generation computing platform 104 may update a currently displayed user interface comprising the selectable item availability output to include a garage in addition to the home. The selectable item availability generation computing platform 104 may continue to update the currently displayed user interface comprising the selectable item availability output based on selectable item availability inputs indicating how many cars the garage holds, whether the garage is attached, whether the garage has living space above, or the like. Similarly, the selectable item availability generation computing platform 104 may continue to update user interfaces comprising the selectable item availability output based on user inputs indicating whether the home has a pool, a deck, a porch, or the like. In yet another example, the selectable item availability input may indicate basement information as described below with regard to FIG. 5. Based on the basement information, the selectable item availability generation computing platform 104 may update the user interfaces comprising the selectable item availability output to include a basement.

In another example, the selectable item availability input may indicate that the user is unemployed. In this example, the selectable item availability generation computing platform 104 may update a figure currently displayed on a user interface comprising the selectable item availability output to have a confused expression.

At step 238, the selectable item availability generation computing platform 104 may establish a connection with the third party source computing platform 106. For example, the selectable item availability generation computing platform 104 may generate a sixth wireless data connection with the third party source computing platform 106 to link the selectable item availability generation computing platform 104 to the third party source computing platform 106.

At step 239, the selectable item availability generation computing platform 104 may generate a source data request. For example, the selectable item availability generation computing platform 104 may generate the source data request based on user input previously received via a user interface of the selectable item availability output. For example, the selectable item availability generation computing platform 104 previously received a vehicle type owned by a user; the selectable item availability generation computing platform 104 may generate a request for manufacturer source data associated with the vehicle type. In another example, the selectable item availability generation computing platform 104 may previously have received an address, and may generate a request for housing source data associated with the address to determine additional information about the house.

At step 240, the selectable item availability generation computing platform 104 may send the source data request. For example, the selectable item availability generation computing platform 104 may send, via the sixth wireless data connection, via the communication interface 119, and to the third party source computing platform 106, the source data request.

In some examples, the selectable item availability generation computing platform 104 may send a request for residential data, vehicle data, financial data, historical data, and the like. In some examples, the third party source computing platform may send, along with the request, location data such as geolocation information, an address, a zip code, and the like. In these examples, the third party source computing platform 106 may determine, based at least in part on the location data, the source data.

Referring to FIG. 2K, at step 241, the third party source computing platform 106 may receive the source data request sent at step 241. For example, the third party source computing platform 106 may receive, via the sixth wireless data connection, the source data request.

At step 242, the third party source computing platform 106 may send the source data requested at step 241. For example, the third party source computing platform 106 may send, via the sixth wireless data connection and to the selectable item availability generation computing platform 104, the source data.

At step 243 the selectable item availability generation computing platform 104 may receive the source data sent at step 242. For example, the selectable item availability generation computing platform 104 may receive, via the sixth wireless data connection and via the communication interface 119, the source data.

At step 244, the selectable item availability generation computing platform 104 may update the selectable item availability output based on the source data. For example, the source data may comprise a year a home was built, a residence type, square footage of the home, and a home type (single family, townhouse, or the like). Based on a determined that the home is a one story single family home, the selectable item availability generation computing platform 104 may update a user interface comprising the selectable item availability output to include a one story single family home located in the determined background scenery. In another example, the source data may comprise an exterior wall type, a roof style, or the like. In this example, the selectable item availability generation computing platform 104 may update the previously determined one story singly family home in the user interface background to have woods siding and a gable asphalt roof based on the source data.

Referring to FIG. 2L, at step 245, the selectable item availability generation computing platform 104 may generate one or more commands directing the user device 107 to cause display of the selectable item availability output.

At step 246, the selectable item availability generation computing platform 104 may send, to the user device 107, the one or more commands generated at step 245. For example, the selectable item availability generation computing platform 104 may send, via the communication interface 119, via the fifth wireless data connection and to the user device 107, one or more commands to cause display of the selectable item availability output. In some example, the selectable item availability generation computing platform 104 may send, along with the one or more commands, the selectable item availability output.

At step 247, the user device 107 may receive the one or more commands and the selectable item availability output. For example, the user device 107 may receive the one or more commands and the selectable item availability output via the fifth wireless data connection and from the selectable item availability generation computing platform 104.

Figure 5:
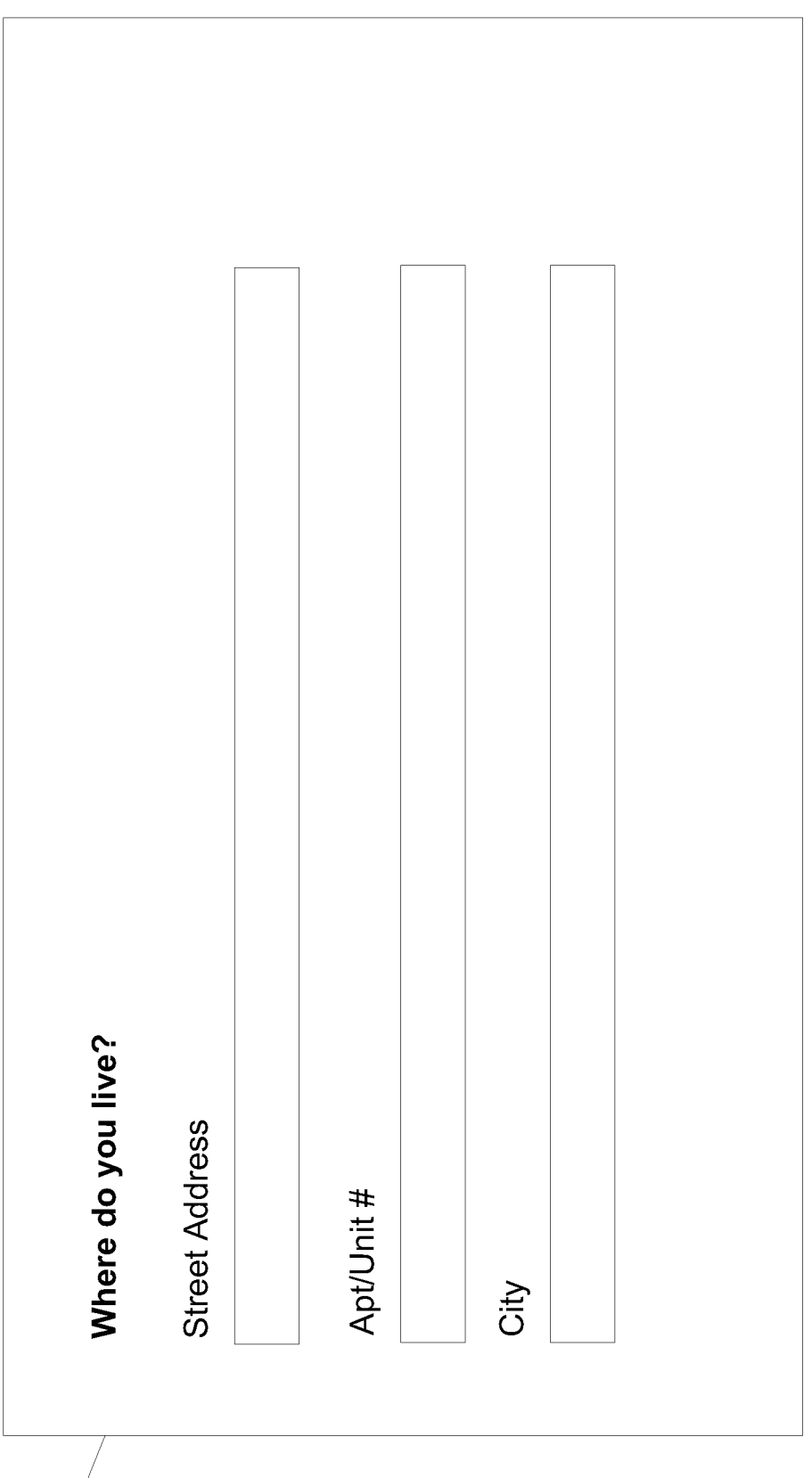

At step 248, the user device 107 may cause display of the selectable item availability output. For example, the user device 107 may cause display of the selectable item availability output in response to receiving the one or more commands at step 247. For example, the user device 107 may display and/or otherwise present a graphical user interface similar to graphical user interface 505, which is illustrated in FIG. 5. The selectable item availability output may allow a user to enter personal information for the purpose of determining insurance rates for home, auto, motorcycle, RV, and the like. Although FIG. 5 shows prompts for an address, it should be understood that the selectable item availability output may allow a user to enter any type of personal information. For example, the user may enter various welcome information such as a zip code, a selection of product type (home, auto, renters, and the like), name, date of birth, gender, amount of time lived at particular address, confirmation of an address, marital status, email, or the like. The user may also enter various vehicle information such as year, model, make, body style, vehicle identification number, acquisition date, whether the vehicle is leased, owned, or financed, whether the vehicle was acquired new, primary vehicle use, whether the vehicle will be used for a ride sharing program, estimated annual mileage, parking locations, or the like. The user may also enter various home information such as purchase date, whether a residence is a primary residence, roof age, garage information (number of cars held, attached/not attached, living space above/no living space above, have a car port instead, or the like), pool type (above ground, in ground, no pool, or the like), deck type (deck, porch, neither, or the like), home foundation (slab at grade, basement, crawl space, piers, hillside with basement, hillside without basement, or the like), percent of basement that is finished, number of fireplaces, protective devices (burglar alarm, fire alarm, fire sprinklers, backup generator, home automation system, or the like). The user may also enter household information such as employment status, age at which driver's license was obtained, number of accidents within a predetermined period, number of people in household, pets, tobacco user/non-tobacco user, current auto insurance information (whether user is listed on someone else's policy, current auto insurance provider, how long a user has had a current policy, how long a user was with a previous insurance provider, when current policy expires, whether user knows their bodily injury liability limits, date new coverage should start, or the like), current home insurance information (currently have insurance, who is the provider, how long user has been with current provider, types of insurance (homeowners, condo, fire, renters, mobile home, landlord package, or the like), expiration date, new start date, or the like). The user may also enter whether they want more, less, or balanced coverage, whether they want the same level of coverage for their home, contact information, or the like.

Referring to FIG. 2M, at step 249, the user device 107 may receive a selectable item availability input. For example, in receiving the selectable item availability input, the user device may receive a user input comprising the personal information described with regard to FIG. 5.

At step 250, the user device 107 may send the selectable item availability input to the selectable item availability generation computing platform 104. For example, the user device 107 may send, via the fifth wireless data connection and to the selectable item availability generation computing platform 104, the selectable item availability input.

At step 251, the selectable item availability generation computing platform 104 may receive the selectable item availability input. For example, the selectable item availability generation computing platform 104 may receive, from the user device 107, via the communication interface 119, and via the fifth wireless data connection, the selectable item availability input.

At step 252, the selectable item availability generation computing platform 104 may determine whether more selectable item availability inputs will be received. For example, the selectable item availability generation computing platform 104 may determine whether a final user interface of the selectable item availability output has been sent to the user device 107. If more selectable item availability inputs will be received, the selectable item availability generation computing platform 104 may return to step 237 to update the selectable item availability output based on the selectable item availability input. If more selectable item availability inputs will not be received, the selectable item availability generation computing platform 104 may proceed to step 253.

Referring to FIG. 2N, at step 253, the selectable item availability generation computing platform 104 may generate a selectable item availability result output. For example, the selectable item availability generation computing platform 104 may determine one or more insurance products to offer based on the selectable item availability inputs. In some examples, the selectable item availability generation computing platform 104 may generate the selectable item availability result output via machine learning algorithms and datasets. For example, the selectable item availability generation computing platform 104 may store historical selectable item availability inputs associated with historical selectable item availability result outputs. For example, the selectable item availability generation computing platform 104 may generate one or more machine learning datasets for various selectable item availability result outputs, and may store the selectable item availability inputs in those machine learning datasets. Then, when a new set of selectable item availability inputs are received (for example, a new user accesses the selectable item availability and provides personal information), those selectable item availability inputs may be compared to the various machine learning datasets. If the selectable item availability generation computing platform 104 determines that the selectable item availability inputs match one or more of the machine learning datasets to a degree that exceeds a predetermined threshold, the selectable item availability generation computing platform 104 may use a selectable item availability result output associated with those one or more machine learning datasets as the selectable item availability output (for example, the selectable item availability generation computing platform 104 may send this selectable item availability output to the user device 107 for display).

At step 254, the selectable item availability generation computing platform 104 may generate one or more commands directing the user device 107 to cause display of the selectable item availability result output.

At step 255, the selectable item availability generation computing platform 104 may send the selectable item availability result output and the commands generated at step 254. For example, the selectable item availability generation computing platform 104 may send the one or more commands and the selectable item availability result output via the fifth wireless data connection, via the communication interface 119, and to the user device 107.

At step 256, the user device 107 may receive the selectable item availability result output and the one or more commands sent at step 255. For example, the user device 107 may receive, via the fifth wireless data connection and from the selectable item availability generation computing platform 104, the selectable item availability result and one or more commands.

Referring to FIG. 2O, at step 257, the user device 107 may cause display of the selectable item availability result output. For example, the user device 107 may cause display of the selectable item availability result output based on the one or more commands received at step 256. In causing display of the selectable item availability result output, the user device 107 may cause display of a quote summary including an auto quote, a home quote, a monthly total, an option to purchase, total savings, or the like.

Subsequently, the example event sequence may end, and selectable item availability generation computing platform 104 may continue to generate selectable item availability outputs in a similar manner as discussed above (e.g., by receiving selectable item availability content and configuration outputs from the content output control computing platform 103 and the switchboard output control computing platform 102 respectively, receiving selectable item availability inputs in response to the selectable item availability outputs, and determining selectable item availability output results based on the user input). By operating in this way, selectable item availability generation computing platform 104 improve the efficiency of shopping for insurance products for users and the efficiency of updating the user interfaces for organizations associated with those user interfaces.

Although the method described by FIGS. 2A-2O describes purchasing home and auto insurance products, these are merely illustrative. It should be understood that this method may be used to purchase any additional insurance products such as RV, motorcycle, life, boat, and the like. In addition, it should be understood that this method may be used to purchase any type of item and is not limited to insurance products.

Figure 6:
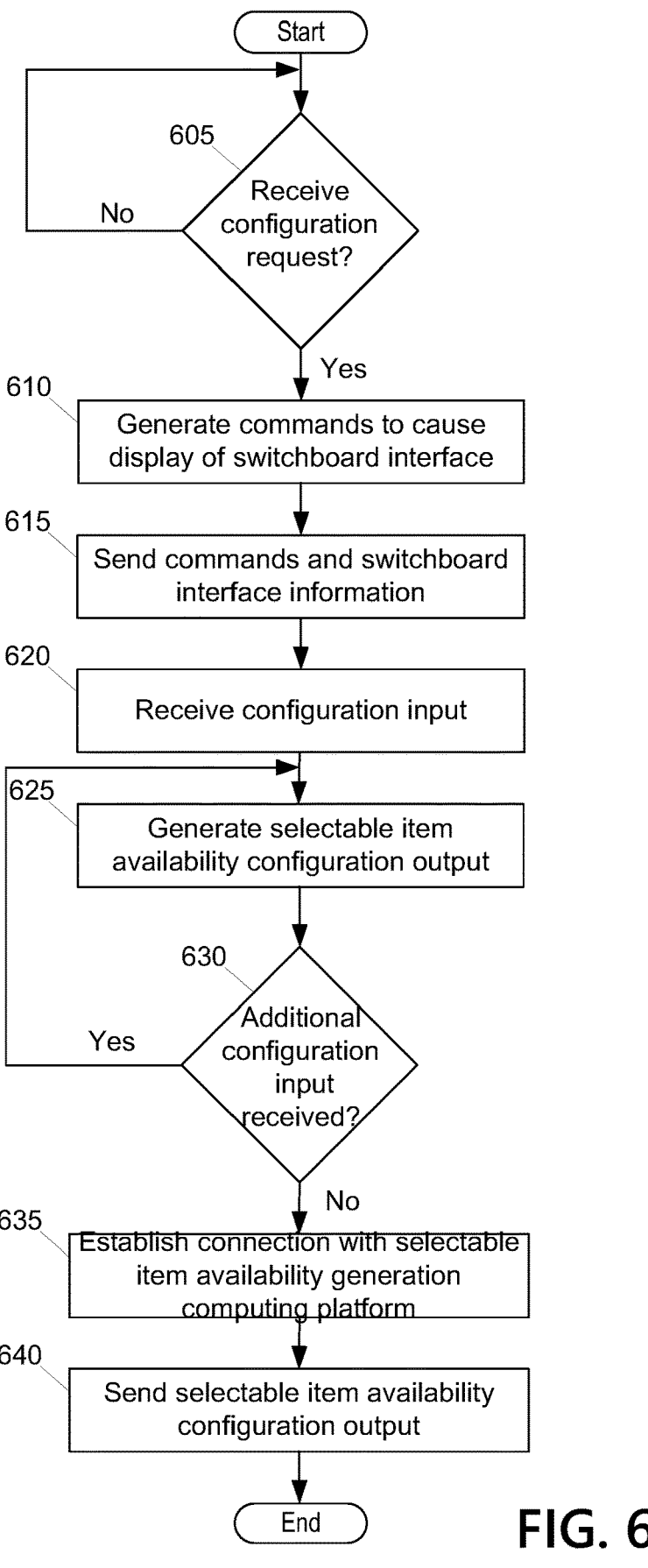
FIGS. 6-8 depict an illustrative methods for deploying a switchboard output control computing platform, a content output control computing platform, and a selectable item availability generation computing platform that utilize improved selectable item availability output generation techniques in accordance with one or more example arrangements discussed herein.

FIG. 6 depicts an illustrative method for deploying a switchboard output control computing platform that utilizes improved selectable item availability output generation techniques in accordance with one or more example embodiments. Referring to FIG. 6, at step 605, the switchboard output control computing platform may determine whether a selectable item availability configuration update request was received. If not, the switchboard output control computing platform may wait to receive a selectable item availability configuration update request. If a selectable item availability configuration update request is received, the switchboard output control computing platform may proceed to step 610.

At step 610, the switchboard output control computing platform may generate one or more commands to cause display of a switchboard interface output. At step 615, the switchboard output control computing device may send the one or more commands, along with switchboard interface output information, to a selectable item availability management platform. At step 620, the switchboard output control computing platform may receive, from the selectable item availability management platform, a selectable item availability configuration update input. At step 625, based on the selectable item availability configuration update input, the switchboard output control computing platform may generate a selectable item availability configuration output. At step 630, the switchboard output control computing platform may determine whether an additional selectable item availability configuration update request was received. If so, the switchboard output control computing platform may return to step 625. If not, the switchboard output control computing platform may proceed to step 635.

At step 635, the switchboard output control computing platform may establish a connection with a selectable item availability generation computing platform. At step 640, the switchboard output control computing platform may send the selectable item availability configuration output to the selectable item availability generation computing platform.

Figure 7:
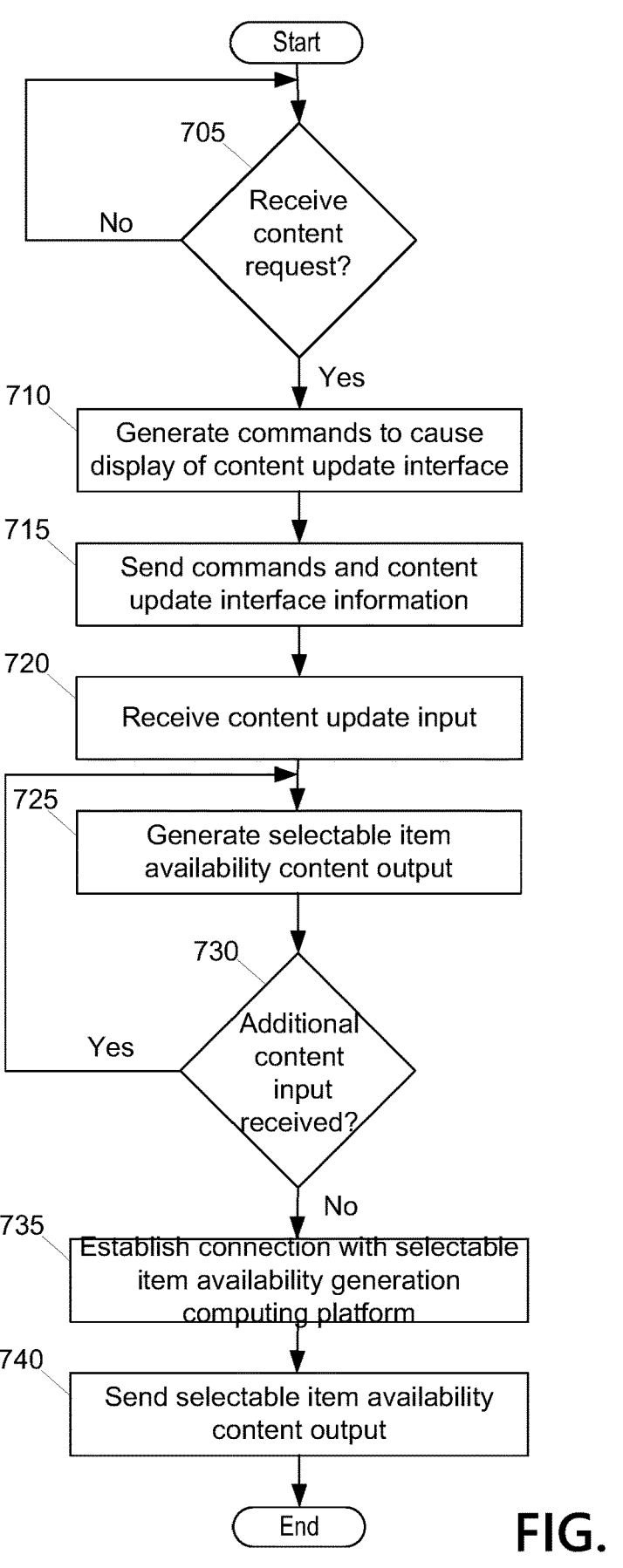

FIG. 7 depicts an illustrative method for deploying a content output control computing platform that utilizes improved selectable item availability output generation techniques in accordance with one or more example embodiments. At step 705, the content output control computing platform may determine whether a selectable item availability content update request was received. If not, the content output control computing platform may wait until a selectable item availability content update request was received. If a selectable item availability content update request was received, the content output control computing platform may proceed to step 710.

At step 710, the content output control computing platform may generate one or more commands directing a selectable item availability management computing platform 105 to cause display of a content update interface. At step 715 the content output control computing platform may send the one or more commands and content update interface information to the selectable item availability management computing platform 105. At step 720, the content output computing platform may receive a selectable item availability content update input. At step 725, the content output control computing platform may generate a selectable item availability content output based on the selectable item availability content update input. At step 730, if additional selectable item availability content update inputs are received, the content output control computing platform may return to step 725. If not, the content output control computing platform may proceed to step 735.

At step 735, the content output control computing platform may establish a connection a selectable item availability generation computing platform. At step 740, the content output control computing platform may send the selectable item availability content output to the selectable item availability generation computing platform.

Figure 8:
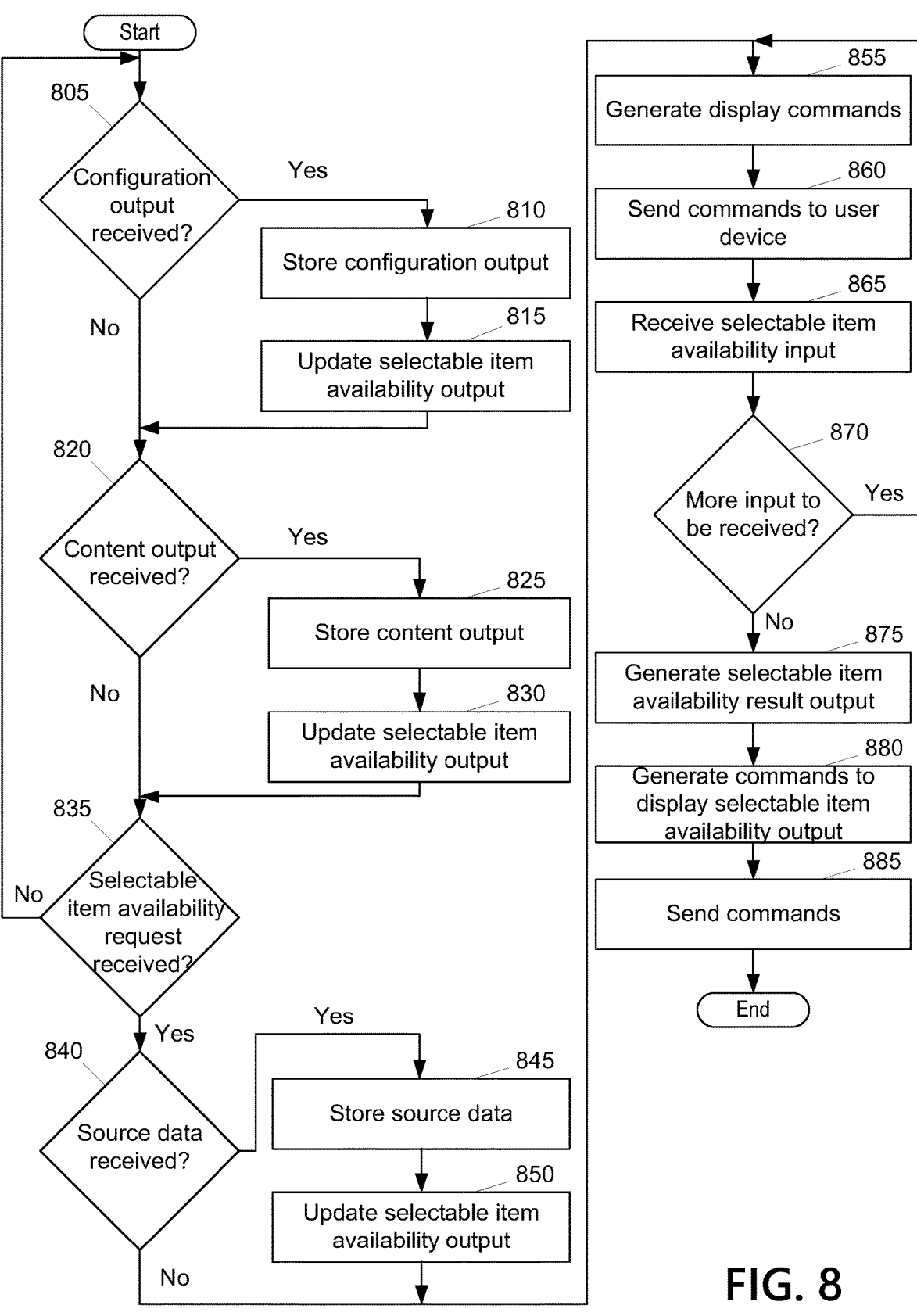

FIG. 8 depicts an illustrative method for deploying a selectable item availability generation computing platform that utilizes improved selectable item availability output generation techniques in accordance with one or more example embodiments. At step 805, the selectable item availability generation computing platform may determine whether a selectable item availability configuration output was received. If a selectable item availability configuration output was not received, the selectable item availability generation computing platform may proceed to step 820. If a selectable item availability configuration output was received, the selectable item availability generation computing platform may proceed to step 810. At step 810, the selectable item availability generation computing platform may store the selectable item availability configuration output. At step 815, the selectable item availability generation computing platform may update the selectable item availability output based on the selectable item availability configuration output. At step 820, the selectable item availability generation computing platform may determine whether a selectable item availability output was received. If a selectable item availability output was not received, the selectable item availability configuration output may proceed to step 835. If a selectable item availability output was received, the selectable item availability generation computing platform may proceed to step 825. At step 825, the selectable item availability generation computing platform may store the selectable item availability content output. At step 830, the selectable item availability generation computing platform may update the selectable item availability output based on the selectable item availability content output. At step 835, selectable item availability generation computing platform may determine whether a selectable item availability request was received. If a selectable item availability request was not received, the selectable item availability generation computing platform may return to step 805. If a selectable item availability request was received, the selectable item availability generation computing platform may proceed to step 840. At step 840 the selectable item availability generation computing platform may determine whether source data was received. If third party source data was not received, the selectable item availability generation computing platform may proceed to step 855. If third party source data was received, the selectable item availability generation computing platform may proceed to step 845. At step 845, the selectable item availability generation computing platform may store the third party source data. At step 850, the selectable item availability generation computing platform may update the selectable item availability output based on the third party source data. At step 855 the selectable item availability generation computing platform may generate one or more commands to display a selectable item availability output.

At step 860, the selectable item availability generation computing platform may send the one or more commands to a user device. At step 865, the selectable item availability generation computing platform may receive a selectable item availability input. At step 870, the selectable item availability generation computing platform may determine whether more additional selectable item availability inputs will be received. If so, the selectable item availability generation computing platform may return to step 855. If not, the selectable item availability generation computing platform may proceed to step 875. At step 875, the selectable item availability generation computing platform may generate a selectable item availability result output. At step 880, the selectable item availability generation computing platform may generate one or more commands directing the user device to display the selectable item availability result output. At step 885, the selectable item availability generation computing platform may send the one or more commands to the user device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A system comprising:

at least one processor;

a selectable item availability generation computing platform;

a display communicatively coupled to the at least one processor; and memory storing computer-readable instructions that, when executed by the at least one processor, cause the system to:

receive, using a first user interface that is displayed on the display, a first user input indicating a first request to access a selectable item availability output, the first user input comprising user data received via the first user interface, and the request to access a selectable item availability output comprising the user data;

send, via a first wireless data connection, the first request to access the selectable item availability output, wherein when the first request is received by the selectable item availability generation computing platform, the selectable item availability generation computing platform generates an updated selectable item availability output;

display, in a second user interface that is displayed on the display subsequently to the first user interface, the updated selectable item availability output received from the selectable item availability generation computing platform according to one or more commands, the updated selectable item availability output displayed in the second user interface comprising a displayed image based on the user data, which was input using the first user interface;

receive a second user input, wherein the second user input comprises personal information related to the updated selectable item availability output;

generate one or more commands to cause display of the updated selectable item availability output;

send, via the first wireless data connection, the second user input, wherein when received by the selectable item availability generation computing platform, the selectable item availability generation computing platform generates a selectable item availability result; and display the selectable item availability result received from the selectable item availability generation computing platform on the display according to one or more commands, wherein the selectable item availability result is generated by the selectable item availability generation computing platform using at least one machine learning algorithm, the machine learning algorithm performing a comparison of the first user input and/or the second user input to contents of a database containing previous selectable item availability inputs, wherein the selectable item availability result is associated with the previous selectable item availability inputs when the comparison results in a match that exceeds a predetermined threshold.

2. The system of claim 1, wherein the selectable item availability output is an online tool for purchasing insurance products, and the displayed image is a background image associated with the insurance products or a representation of an item associated with the insurance products.

3. The system of claim 1, wherein the memory stores additional computer-readable instructions that, when executed by the at least one processor, further cause the system to:

receive, via the first wireless data connection, from the selectable item availability generation computing platform, a user interface design, wherein the user interface design is generated according to the first user input.

4. The system of claim 1, wherein the selectable item availability generation computing platform configured to receive requests to access selectable item availability outputs, ingest one or more user inputs, to generate selectable item availability outputs, and to generate selectable item availability results.

5. The system of claim 1, wherein the updated selectable item availability output may be a series of one or more prompts requesting user data for a purpose of determining insurance rates.

6. The system of claim 1, wherein the display is integrated into one of a desktop computer, laptop, mobile phone, smartphone, or tablet.

7. A method comprising:

receiving, using a first user interface that is displayed on a display of a user device, a first user input indicating a first request to access a selectable item availability output, the first user input comprising user data entered via the first user interface, and the request to access a selectable item availability output comprising the user data;

sending, via a first wireless data connection, the first request to access the selectable item availability output, wherein when the first request is received by a selectable item availability generation computing platform, the selectable item availability generation computing platform generates an updated selectable item availability output;

displaying, in a second user interface that is displayed on the display subsequently to the first user interface, the updated selectable item availability output on the user interface according to one or more commands, the updated selectable item availability output displayed in the second user interface including a displayed image based on the user data, which was input using the first user interface;

receiving a second user input, wherein the second user input comprises personal information related to the updated selectable item availability output;

sending, via the first wireless data connection, the second user input, wherein when received by the selectable item availability generation computing platform, the selectable item availability generation computing platform generates a selectable item availability result;

receiving, via the first wireless data connection, from the selectable item availability generation computing platform, the selectable item availability result and one or more commands to cause display of the selectable item availability result; and displaying the selectable item availability result on the user interface, wherein the selectable item availability result is generated by the selectable item availability generation computing platform using at least one machine learning algorithm, the machine learning algorithm performing a comparison of the first user input and/or the second user input to contents of a database containing previous selectable item availability inputs, wherein the selectable item availability result is associated with the previous selectable item availability inputs when the comparison results in a match that exceeds a predetermined threshold.

8. The method of claim 7, wherein the selectable item availability output is an online tool for purchasing insurance products, and the displayed image is a background image associated with the insurance products or a representation of an item associated with the insurance products.

9. The method of claim 7, further comprising:

receiving, via the first wireless data connection, from the selectable item availability generation computing platform, a user interface design, wherein the user interface design is generated according to the first user input.

10. The method of claim 7, wherein the selectable item availability generation computing platform configured to receive requests to access selectable item availability outputs, ingest one or more user inputs, to generate selectable item availability outputs, and to generate selectable item availability results.

11. The method of claim 7, wherein the updated selectable item availability output may be a series of one or more prompts requesting user data for a purpose of determining insurance rates.

12. The method of claim 7, wherein the display is integrated into one of a desktop computer, laptop, mobile phone, smartphone, or tablet.

13. A non-transitory, computer readable medium storing computer executable instructions, which when executed by a processor, cause a system to:

receive, using a first user interface that is displayed on a display of a user device, a first user input indicating a first request to access a selectable item availability output, the first user input comprising user data entered via the first user interface, and the request to access a selectable item availability output comprising the user data;

send, via a first wireless data connection, the first request to access the selectable item availability output, wherein the first request is received from a first user input, and wherein when the first request is received by a selectable item availability generation computing platform, the selectable item availability generation computing platform generates an updated selectable item availability output;

receive, via the first wireless data connection, from the selectable item availability generation computing platform, the updated selectable item availability output and one or more commands to cause display of the updated selectable item availability output;

display, in a second user interface that is displayed on the display subsequently to the first user interface, the updated selectable item availability output on the user interface, the updated selectable item availability output displayed in the second user interface including a displayed image based on the user data, which was input using the first user interface;

send, via the first wireless data connection, a second user input comprised of at least personal information related to the updated selectable item availability output, wherein when received by the selectable item availability generation computing platform, the selectable item availability generation computing platform generates a selectable item availability result;

receive, via the first wireless data connection, from the selectable item availability generation computing platform, the selectable item availability result and one or more commands to cause display of the selectable item availability result; and display the selectable item availability result on the user interface, wherein the selectable item availability result is generated by the selectable item availability generation computing platform using at least one machine learning algorithm, the machine learning algorithm performing a comparison of the first user input and/or the second user input to contents of a database containing previous selectable item availability inputs, wherein the selectable item availability result is associated with the previous selectable item availability inputs when the comparison results in a match that exceeds a predetermined threshold.

14. The non-transitory, computer readable medium of claim 13, wherein the selectable item availability output is an online tool for purchasing insurance products, and the displayed image is a background image associated with the insurance products or a representation of an item associated with the insurance products.

15. The non-transitory, computer readable medium of claim 13 storing further instructions, that when executed by the processor, cause the one or more processors to:

receive, via the first wireless data connection, from the selectable item availability generation computing platform, a user interface design, wherein the user interface design is generated according to the first user input.

16. The non-transitory, computer readable medium of claim 13, wherein the selectable item availability generation computing platform configured to receive requests to access selectable item availability outputs, ingest one or more user inputs, to generate selectable item availability outputs, and to generate selectable item availability results.

17. The non-transitory, computer readable medium of claim 13, wherein the updated selectable item availability output may be a series of one or more prompts requesting user data for a purpose of determining insurance rates.

* * * * *